US012738618B2

(12) United States Patent
Zhou et al.

(10) Patent No.: US 12,738,618 B2
(45) Date of Patent: Sep. 15, 2026

(54) SEMICONDUCTOR SWITCH DEVICE, MANUFACTURING METHOD THEREOF, AND SOLID-STATE PHASE SHIFTER

(71) Applicant: Huawei Technologies Co., Ltd., Shenzhen (CN)

(72) Inventors: Yuantao Zhou, Shenzhen (CN); Ming Wu, Shenzhen (CN); Pengyu Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 656 days.

(21) Appl. No.: 17/727,258

(22) Filed: Apr. 22, 2022

(65) Prior Publication Data

US 2022/0247055 A1 Aug. 4, 2022

Related U.S. Application Data

(63) Continuation of application No. PCT/CN2020/123374, filed on Oct. 23, 2020.

(30) Foreign Application Priority Data

Oct. 24, 2019 (CN) ........................ 201911019107.X

(51) Int. Cl.

*H01P 1/185* (2006.01)
*H01P 11/00* (2006.01)
*H01Q 3/36* (2006.01)

(52) U.S. Cl.

CPC .............. *H01P 1/185* (2013.01); *H01P 11/00* (2013.01); *H01Q 3/36* (2013.01)

(58) Field of Classification Search

CPC ............ H01P 1/185; H01P 11/00; H01Q 3/36
See application file for complete search history.

(56) References Cited

U.S. PATENT DOCUMENTS

| | | | | |
|---|---|---|---|---|
| 7,816,739 | B2 | 10/2010 | Kawasaki | |
| 2008/0099881 | A1 | 5/2008 | Jung et al. | |
| 2010/0208517 | A1 * | 8/2010 | Lo | H01L 29/868 257/656 |

(Continued)

FOREIGN PATENT DOCUMENTS

| | | | |
|---|---|---|---|
| CN | 1327617 | A | 12/2001 |
| CN | 101170110 | A | 4/2008 |

(Continued)

*Primary Examiner* — Timor Karimy
(74) *Attorney, Agent, or Firm* — Conley Rose, P.C.

(57) ABSTRACT

A semiconductor switch device includes a first semiconductor layer, intrinsic layers, and second semiconductor layers that are stacked. There are at least two intrinsic layers. The second semiconductor layers are in a one-to-one correspondence with the intrinsic layers, and each second semiconductor layer is stacked on a side of a corresponding intrinsic layer away from the first semiconductor layer. The first semiconductor layer forms one PIN diode together with each first intrinsic layer and each second semiconductor layer. Any two adjacent PIN diodes are electrically isolated. Automatic parameter matching between the two PIN diodes is implemented by using a geometrically symmetric figure with centers of the two PIN diodes aligned. In addition, the entire semiconductor switch device has a compact structure.

20 Claims, 18 Drawing Sheets

(56) References Cited

U.S. PATENT DOCUMENTS

| | | | | |
|---|---|---|---|---|
| 2011/0267154 | A1* | 11/2011 | Carroll | H03K 17/693 333/103 |
| 2011/0278598 | A1 | 11/2011 | Renaud | |
| 2012/0187413 | A1 | 7/2012 | Saito et al. | |
| 2014/0091316 | A1 | 4/2014 | Kikkawa | |
| 2014/0299916 | A1 | 10/2014 | Bourennane et al. | |
| 2018/0190688 | A1* | 7/2018 | Han | H10F 39/8033 |
| 2019/0131276 | A1* | 5/2019 | Chen | H01L 24/19 |
| 2019/0198558 | A1* | 6/2019 | Jeon | H10F 77/206 |
| 2020/0021136 | A1 | 1/2020 | Suga et al. | |
| 2021/0217900 | A1 | 7/2021 | Wang et al. | |

FOREIGN PATENT DOCUMENTS

| | | | |
|---|---|---|---|
| CN | 102292812 | A | 12/2011 |
| CN | 102623494 | A | 8/2012 |
| CN | 103066072 | A | 4/2013 |
| CN | 103715244 | A | 4/2014 |
| CN | 205122584 | U | 3/2016 |
| CN | 107731818 | A | 2/2018 |
| CN | 109742161 | A | 5/2019 |
| CN | 109792161 | A | 5/2019 |
| EP | 3840057 | A1 | 6/2021 |
| JP | S6191969 | A | 5/1986 |
| JP | 2004014658 | A | 1/2004 |
| JP | 2014534622 | A | 12/2014 |
| JP | 2022524009 | A | 4/2022 |
| KR | 20180079979 | A | 7/2018 |

* cited by examiner

SEMICONDUCTOR SWITCH DEVICE, MANUFACTURING METHOD THEREOF, AND SOLID-STATE PHASE SHIFTER

CROSS-REFERENCE TO RELATED APPLICATIONS

This is a continuation of International Patent Application No. PCT/CN2020/123374 filed on Oct. 23, 2020, which claims priority to Chinese Patent Application No. 201911019107.X filed on Oct. 24, 2019. The disclosures of the aforementioned applications are hereby incorporated by reference in their entireties.

TECHNICAL FIELD

This application relates to the technical field of diodes, and in particular, to a semiconductor switch device, a manufacturing method thereof, and a solid-state phase shifter.

BACKGROUND

Currently, a mainstream form of a p-type, intrinsic, n-type (PIN) diode device in the industry is a discrete device, in other words, a package of each device includes a single PIN die. However, using a discrete device to optimize linearity leads to many difficulties in device costs, a size, and element matching. In addition, a discrete diode element needs to have an accurately matched parameter, to use a PIN diode in serial/parallel connection. However, in practice, because a semiconductor process fluctuates from lot to lot, from wafer to wafer, and even within a wafer size, a comprehensive error range of a parameter is as high as ±20%, and a mismatch leads to a great decrease in an effect of circuit linearity improvement.

To facilitate simple serial/parallel connection of a user, a manufacturer packages dies of two PIN diodes in one chip package, and there may be a plurality of connection forms, including common-anode connection, common-cathode connection, serial connection, and the like. The common-anode connection and the common-cathode connection may further implement parallel connection or reverse serial connection. An integrated device has no substantial improvement compared with approaches in which two separate discrete PIN diodes are used.

SUMMARY

This application provides a semiconductor switch device, a manufacturing method thereof, and a solid-state phase shifter, to improve performance of the semiconductor switch device.

According to a first aspect, a semiconductor switch device is provided. The semiconductor switch device includes a first semiconductor layer, intrinsic layers, and second semiconductor layers that are stacked in a sandwich structure. There are at least two intrinsic layers. The at least two intrinsic layers have a same thickness, and used materials have a same doping density coefficient. During disposing of the second semiconductor, the second semiconductors are in a one-to-one correspondence with the intrinsic layers, and each second semiconductor layer is stacked on a side of a corresponding intrinsic layer away from the first semiconductor layer. Polarities of the first semiconductor layer and the second semiconductor layers are opposite. For example, when the first semiconductor layer is an N+ semiconductor layer, the second semiconductor layer is a P+ semiconductor layer, or when the first semiconductor layer is a P+ semiconductor layer, the second semiconductor layer is an N+ semiconductor layer. It should be noted that the semiconductor switch device provided in this application includes at least two PIN diodes. For example, the first semiconductor layer forms one PIN diode together with each first intrinsic layer and each second semiconductor layer. When there are at least two intrinsic layers, correspondingly, there are two PIN diodes, and any two adjacent PIN diodes are electrically isolated. Based on the semiconductor switch device provided in this application, no process difference is generated during epitaxial growth of the intrinsic layers and growth of the first semiconductor layer and the second semiconductor layers, so that automatic parameter matching between different PIN diodes is implemented, and automatic parameter matching between the two PIN diodes can be implemented, to improve linearity. In addition, the entire semiconductor switch device has a compact structure, a smaller chip packaging area, and lower costs.

In a specific feasible solution, shapes of each second semiconductor and the corresponding intrinsic layer are centrosymmetric shapes.

In a specific feasible solution, shapes of each second semiconductor layer and the corresponding intrinsic layer are the same, and each may be a symmetric shape such as a circle or a square.

In a specific feasible solution, there are at least two PIN diodes, and the at least two PIN diodes include at least one first PIN diode and at least one second PIN diode, so that the entire semiconductor switch device has a compact structure.

In a specific feasible solution, an area ratio of a first surface of each first PIN diode to a second surface of each second PIN diode is 1:N, where N is a rational number greater than or equal to 1, for example, a positive rational number such as 1, 2, 3, or 5. The first surface is an effective area of doped particles in a surface of a second semiconductor layer of the first PIN diode away from the first semiconductor layer, and the second surface is an effective area of doped particles in a surface of a second semiconductor layer of the second PIN diode away from the first semiconductor layer. The areas in the specified ratio improve linearity of a circuit to which the semiconductor switch device is applied.

In a specific feasible solution, the semiconductor switch device further includes a first insulation layer embedded in the first semiconductor layer, and the first insulation layer electrically isolates any adjacent PIN diodes. The adjacent PIN diodes are electrically isolated by using the first insulation layer.

In a specific feasible solution, a material used for the first insulation layer may be silicon dioxide, silicon nitride, or another insulating material. The semiconductor switch device is protected by using the disposed insulation layer.

In a specific feasible solution, a second insulation layer is further included, and the second insulation layer is connected to the first insulation layer and covers sidewalls of an intrinsic layer and a second semiconductor layer of any PIN diode, to improve security of the semiconductor switch device.

In a specific feasible solution, a backside metal layer is disposed on a side of the first semiconductor layer away from the intrinsic layer, and the backside metal layer may be a titanium nickel aurum material, a titanium platinum aurum material, a titanium aurum material, or an aluminum material, or may be another material. The PIN diode is electrically connected to the outside by using a pad.

According to a second aspect, this application provides a solid-state phase shifter. The solid-state phase shifter includes the semiconductor switch devices that are described in any one of the foregoing solutions and that are located on a plurality of branch circuits, each branch circuit includes at least one semiconductor switch device, and the semiconductor switch device is connected or disconnected, to generate a phase difference between radio frequency signals respectively transmitted on the plurality of branch circuits. The used semiconductor switch device uses a geometrically symmetric figure with centers of two PIN diodes aligned, to implement automatic parameter matching between the two PIN diodes, thereby improving linearity, and improving an effect of the solid-state phase shifter.

According to a third aspect, a massive multiple-input multiple-output (MIMO) antenna array is provided. The antenna array includes the foregoing solid-state phase shifter and a plurality of antenna units, and the solid-state phase shifter is configured to change a phase relationship between the plurality of antenna units. A semiconductor switch device of the used solid-state phase shifter uses a geometrically symmetric figure with centers of two PIN diodes aligned, to implement automatic parameter matching between the two PIN diodes, thereby improving linearity, and improving a use effect of the antenna array.

According to a fourth aspect, a communications device is provided. The communications device includes the massive multiple-input multiple-output antenna array and a radio frequency signal transceiver. The massive multiple-input multiple-output antenna array is configured to receive a radio frequency signal sent by the radio frequency signal transceiver, or configured to send a radio frequency signal to the radio frequency signal transceiver. Using the antenna array improves a communication effect of the communications device.

According to a fifth aspect, a semiconductor switch device manufacturing method is provided. The manufacturing method includes the following steps: manufacturing a first semiconductor layer and an intrinsic layer, where the first semiconductor layer and the intrinsic layer are stacked; forming a second semiconductor layer on a surface of the intrinsic layer away from the first semiconductor layer; and etching the second semiconductor layer and the intrinsic layer, to form at least two intrinsic layers and a second semiconductor layer corresponding to each intrinsic layer, where the at least two intrinsic layers have a same thickness, and used materials have a same doping density coefficient, where the first semiconductor layer forms one PIN diode together with each first intrinsic layer and each second semiconductor layer, and any two adjacent PIN diodes are electrically isolated; and the first semiconductor layer is an N+ semiconductor layer, and the second semiconductor layer is a P+ semiconductor layer; or the first semiconductor layer is a P+ semiconductor layer, and the second semiconductor layer is an N+ semiconductor layer.

In the foregoing manufacturing method, based on the semiconductor switch device provided in this application, no process difference is generated during epitaxial growth of the intrinsic layer and growth of the first semiconductor layer and the second semiconductor layer, so that automatic parameter matching between different PIN diodes is implemented, and automatic parameter matching between two PIN diodes can be implemented, thereby improving linearity. In addition, the entire semiconductor switch device has a compact structure, a smaller chip packaging area, and lower costs.

In a specific feasible solution, that any two adjacent PIN diodes are electrically isolated is specifically: a gap between any adjacent PIN diodes is filled with a first insulation layer, where the first insulation layer electrically isolates any adjacent intrinsic layers, and electrically isolates any adjacent second semiconductor layers. Adjacent PIN diodes are electrically isolated by using the disposed first insulation layer.

In a specific feasible solution, shapes of the intrinsic layers and the second semiconductor layers that are formed through etching are centrosymmetric shapes.

In a specific feasible solution, that the first semiconductor layer forms one PIN diode together with each first intrinsic layer and each second semiconductor layer specifically includes: there are at least two PIN diodes, and the at least two PIN diodes include at least one first PIN diode and at least one second PIN diode.

In a specific feasible solution, the manufacturing method further includes: an area ratio of a first surface of each first PIN diode to a second surface of each second PIN diode is 1:N, where N is a rational number greater than or equal to 1; the first surface is an effective area of doped particles in a surface of a second semiconductor layer of the first PIN diode away from the first semiconductor layer; and the second surface is an effective area of doped particles in a surface of a second semiconductor layer of the second PIN diode away from the first semiconductor layer.

DESCRIPTION OF EMBODIMENTS

To make the objectives, technical solutions, and advantages of this application clearer, the following further describes this application in detail with reference to the accompanying drawings.

To facilitate understanding of a semiconductor switch device provided in the embodiments of this application, first, an application scenario of the semiconductor switch device provided in the embodiments of this application is described below. The semiconductor switch device, as a control switch, is used in a solid-state phase shifter for signal transmission and receiving.

Figure 1A:
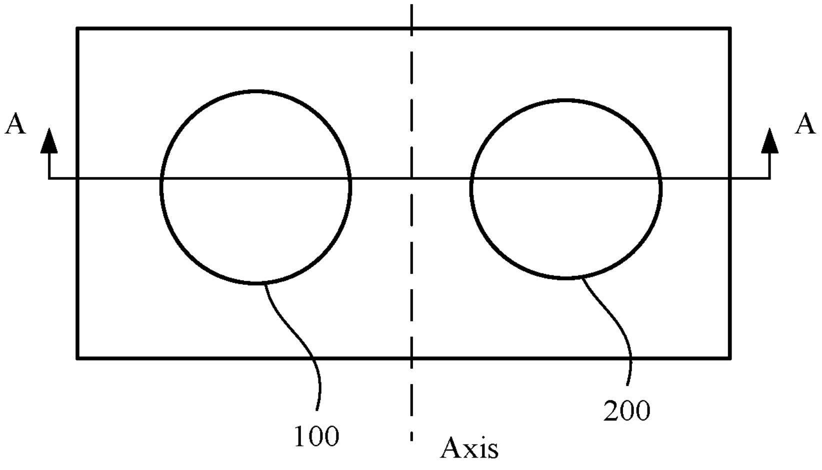
FIG. 1A is a top view of a semiconductor switch device according to an embodiment of this application.
Figure 1B:
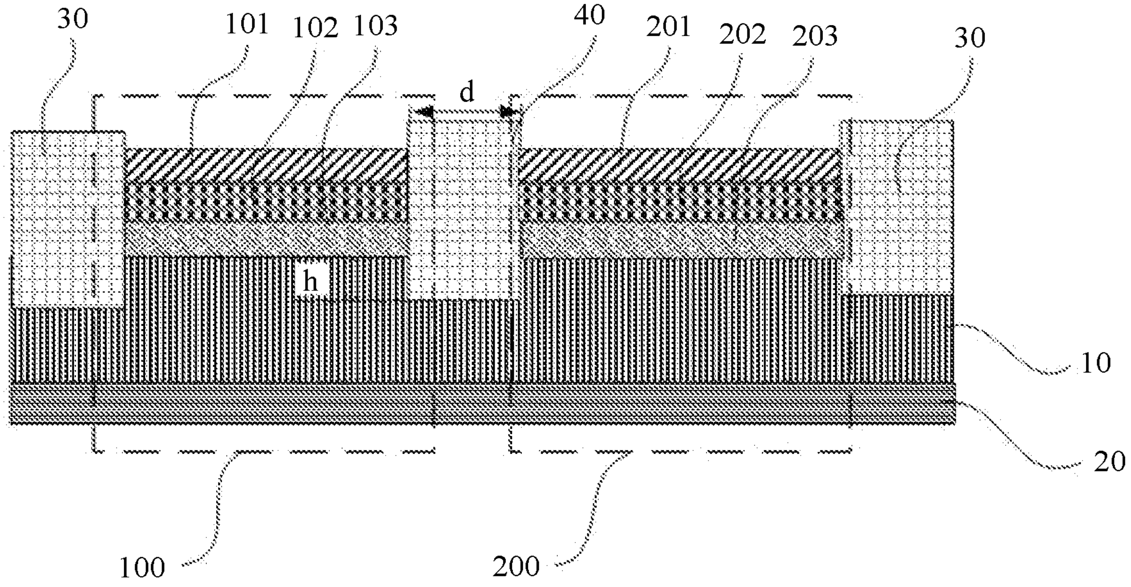
FIG. 1B is a cross-sectional view at A-A in FIG. 1A.

FIG. 1A is a top view of a semiconductor switch device according to an embodiment of this application, and FIG. 1B is a cross-sectional view at A-A in FIG. 1A. In this embodiment of this application, the semiconductor switch device is disposed in a stacked structure, and two electrically isolated PIN diodes are formed. For ease of description, the two PIN diodes are respectively named as a first PIN diode 100 and a second PIN diode 200. Still referring to FIG. 1A and FIG. 1B, each of the first PIN diode 100 and the second PIN diode 200 is stacked in a sandwich structure. The first PIN diode 100 includes a first semiconductor layer 10, an intrinsic layer, and a second semiconductor layer a102 that are stacked. For ease of description, the intrinsic layer of the first PIN diode 100 is named a first intrinsic layer 103. It can be learned from FIG. 1B that the first intrinsic layer 103 is located between the first semiconductor layer 10 and the second semiconductor layer a102. The first semiconductor layer 10 and the second semiconductor layer a102 have opposite polarities. For example, the first semiconductor layer 10 is a P+ semiconductor layer, and the second semiconductor layer a102 is an N+ semiconductor layer; or the first semiconductor layer 10 is an N+ semiconductor layer, and the second semiconductor layer a102 is a P+ semiconductor layer.

Still referring to FIG. 1B, the second PIN diode 200 and the first PIN diode 100 are disposed side by side, the second PIN diode 200 includes the first semiconductor layer 10, an intrinsic layer, and a second semiconductor layer b202 that are stacked in a sandwich structure, and the intrinsic layer is located between the first semiconductor layer 10 and the second semiconductor layer b202. For ease of description, the intrinsic layer of the second PIN diode 200 is named a second intrinsic layer 203. During forming of the semiconductor switch device in this application, a polarity of the second semiconductor layer b202 is the same as the polarity of the second semiconductor layer a102, and is opposite to the polarity of the first semiconductor layer 10. For example, the first semiconductor layer 10 is a P+ semiconductor layer, and the second semiconductor layer b202 is an N+ semiconductor layer; or when the first semiconductor layer 10 is an N+ semiconductor layer, the second semiconductor layer b202 is a P+ semiconductor layer. It can be learned from FIG. 1B that the second PIN diode 200 and the first PIN diode 100 share one first semiconductor layer 10, but the first intrinsic layer 103 is electrically isolated from the second intrinsic layer 203, and the second semiconductor layer a102 is electrically isolated from the second semiconductor layer b202.

Still referring to FIG. 1A and FIG. 1B, the first intrinsic layer 103 and the second intrinsic layer 203 are located at a same layer and are disposed on a same surface of the first semiconductor layer 10, and the second semiconductor layer b202 and the second semiconductor layer a102 are located at a same layer. The first intrinsic layer 103 and the second intrinsic layer 203 have a same thickness, and used materials have a same doping density coefficient. During manufacturing of the first intrinsic layer 103 and the second intrinsic layer 203, the materials used for the first intrinsic layer 103 and the second intrinsic layer 203 have a same doping density, and the doping density changes with the thickness of the intrinsic layer.

Still referring to FIG. 1A and FIG. 1B, shapes of the second semiconductor layer a102 and the corresponding first intrinsic layer 103 of the first PIN diode 100 are centrosymmetric circles, and shapes of the second semiconductor layer b202 and the corresponding second intrinsic layer 203 of the second PIN diode 200 are centrosymmetric circles. Certainly, FIG. 1A is merely an example. The second semiconductor layer a102, the second semiconductor layer b202, the first intrinsic layer 103, and the second intrinsic layer 203 of the first PIN diode 100 and the second PIN diode 200 in this embodiment of this application are not limited to circles, or each may be another centrosymmetric geometric figure such as a square, a regular polygon, or another centrosymmetric figure provided that the shapes of the second semiconductor layer a102 and the corresponding first intrinsic layer 103 of the first PIN diode 100 are centrosymmetric shapes, the shapes and sizes of the second semiconductor layer a102 and the first intrinsic layer 103 are the same, the shapes of the second semiconductor layer b202 and the corresponding second intrinsic layer 203 of the second PIN diode 200 are also centrosymmetric shapes, and the shapes and sizes of the second semiconductor layer b202 and the second intrinsic layer 203 are the same. It should be understood that although FIG. 1A shows an example in which the second semiconductor layer a102 and the second semiconductor layer b202 are circles, it is not limited in this embodiment of this application that the shapes of the second semiconductor layer a102 and the second semiconductor layer b202 are the same. For example, the second semiconductor layer a102 is a circle, and the second semiconductor layer b202 is a square, or the second semiconductor layer a102 is a square, and the second semiconductor layer b202 is a regular pentagon.

When the shapes of the second semiconductor layer a102 and the corresponding first intrinsic layer 103 of the first PIN diode 100 are centrosymmetric shapes, and the shapes of the second semiconductor layer b202 and the corresponding second intrinsic layer 203 of the second PIN diode 200 are also centrosymmetric shapes, the correspondingly formed first PIN diode 100 and second PIN diode 200 are of centrosymmetric structures.

During specific disposing of the first intrinsic layer 103 and the second intrinsic layer 203, the first intrinsic layer 103 and the second intrinsic layer 203 are located on the same surface of the first semiconductor layer 10. The two intrinsic layers are from a same wafer, to eliminate impact caused by a difference between wafer lots. However, reasons for a difference between parameters of wafers used in other approaches art include a difference between lots and a difference between different wafers of a same lot. A conventional method cannot ensure that chips are from a same wafer in a same lot. Even if bare dies from a same wafer are selected through complex and expensive precise material control, a difference between bare dies at different locations on a same wafer cannot be overcome, and as a result, a circuit mismatch and performance degradation cannot be avoided. In this application, wafers in the first PIN diode 100 and the second PIN diode 200 that are connected side by side are from a same wafer. Therefore, a difference between wafer lots and a difference between wafers can be reduced.

During manufacturing of a PIN diode, because a semiconductor process fluctuates with a location on a wafer plane, a difference between parameters is easily caused. During specific disposing, a placement direction of the semiconductor switch device shown in FIG. 1A is used as a reference direction, and vertical axes of the first intrinsic layer 103, the second intrinsic layer 203, the first semiconductor layer 10, the second semiconductor layer a102, and the second semiconductor layer b202 are a same axis. When a parameter difference occurs on the wafer due to nonuniformity of the semiconductor process, because the first PIN diode 100 and the second PIN diode 200 are center-aligned, process fluctuation of the first PIN diode 100 and process fluctuation of the second PIN diode 200 are also the same, to cancel a generated parameter difference, so that parameters of the first PIN diode 100 and the second PIN diode 200 are consistent, to automatically implement matching, thereby resolving a problem during matching between the first PIN diode 100 and the second PIN diode 200.

During matching between the first PIN diode 100 and the second PIN diode 200, different area ratios may be used. For the semiconductor switch device, the area ratio corresponds to an area ratio of a first surface to a second surface. The first surface is an effective area of doped particles in a surface of the second semiconductor layer a102 of the first PIN diode 100 away from the first semiconductor layer 10. When the second semiconductor layer a102 is an N+ semiconductor layer, the doped particles are N+ particles, or when the second semiconductor layer a102 is a P+ semiconductor layer, the doped particles are P+ particles. The second surface is an effective area of doped particles in a surface of the second semiconductor layer b202 of the second PIN diode 200 away from the first semiconductor layer 10. When the second semiconductor layer b202 is an N+ semiconductor layer, the doped particles are N+ particles, or when the second semiconductor layer b202 is a P+ semiconductor layer, the doped particles are P+ particles. The ratio of the first surface to the second surface is 1:N, where N is a rational number greater than or equal to 1, for example, a positive rational number such as 1, 2, 3, or 5. For ease of understanding, simulation processing is performed below in cases of different area ratios of the first PIN diode 100 to the second PIN diode 200.

First, simulation is performed in a case in which the area ratio of the first PIN diode 100 to the second PIN diode 200 is 1:1.

Figure 2A:
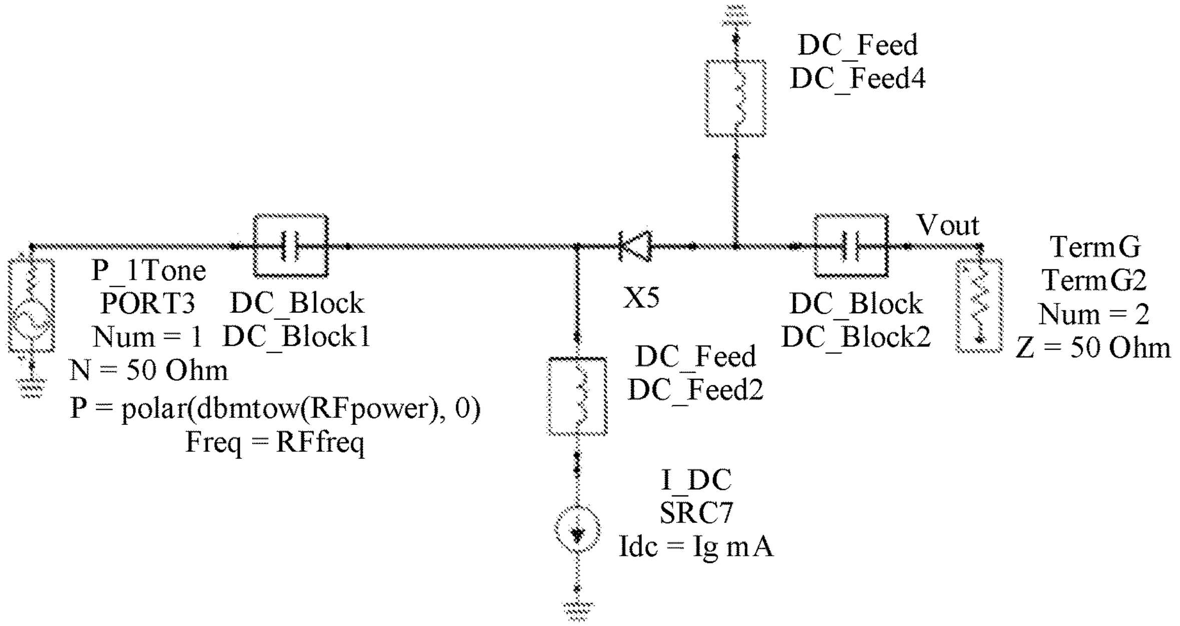
FIG. 2A shows a harmonic simulation circuit of a single PIN diode in a forward-biased state.
Figure 2B:
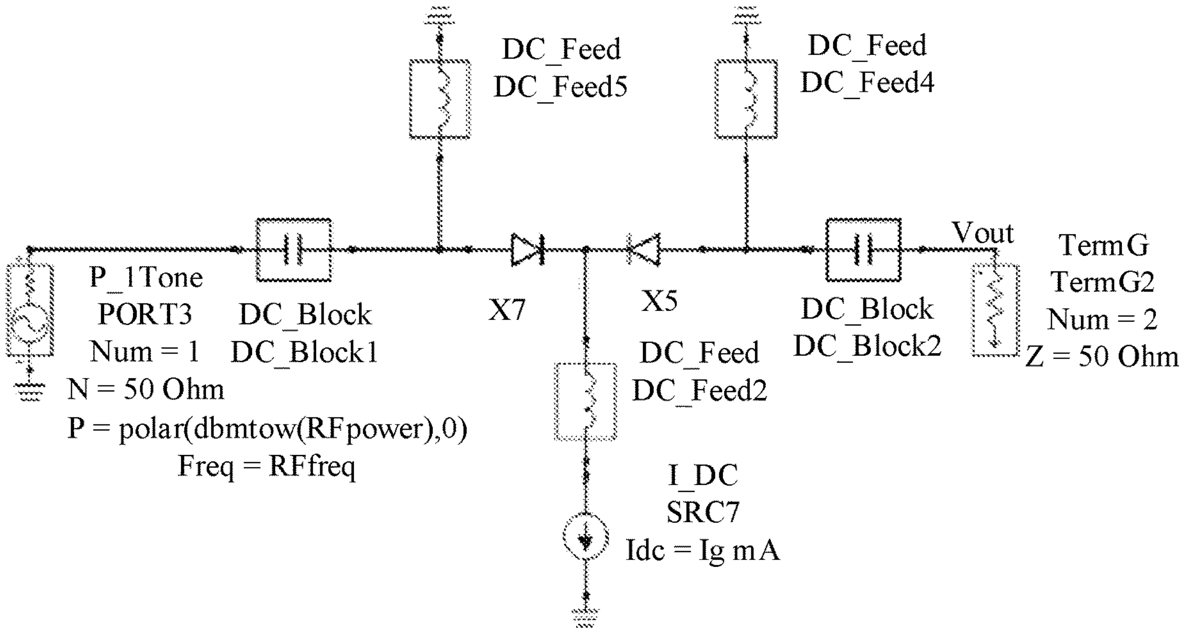
FIG. 2B shows a harmonic simulation circuit of the semiconductor switch device in this embodiment of this application in a forward-biased state.
Figure 3A:
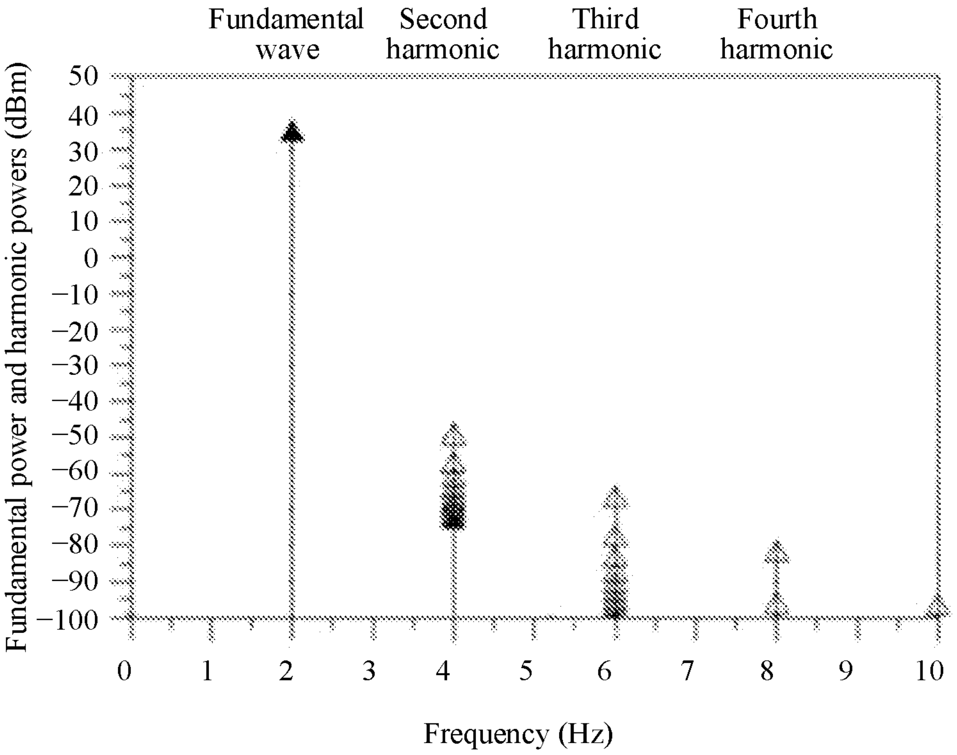
FIG. 3A shows a simulation result of a single PIN diode in harmonic balance (Harmonic Balance)
Figure 3B:
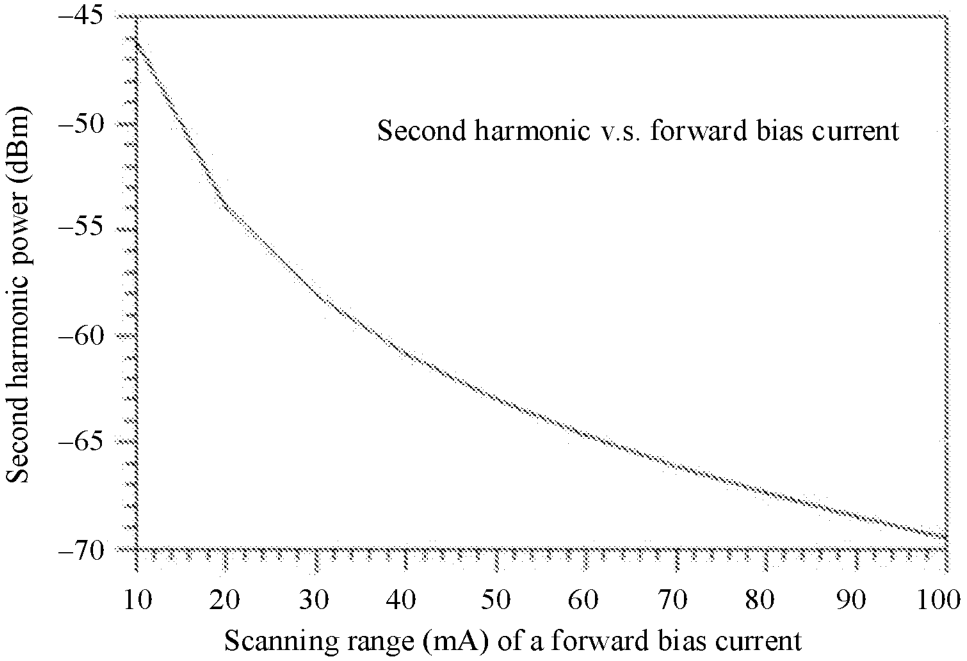
FIG. 3B shows a change trend of a single PIN diode with a forward bias current in a second harmonic.
Figure 4A:
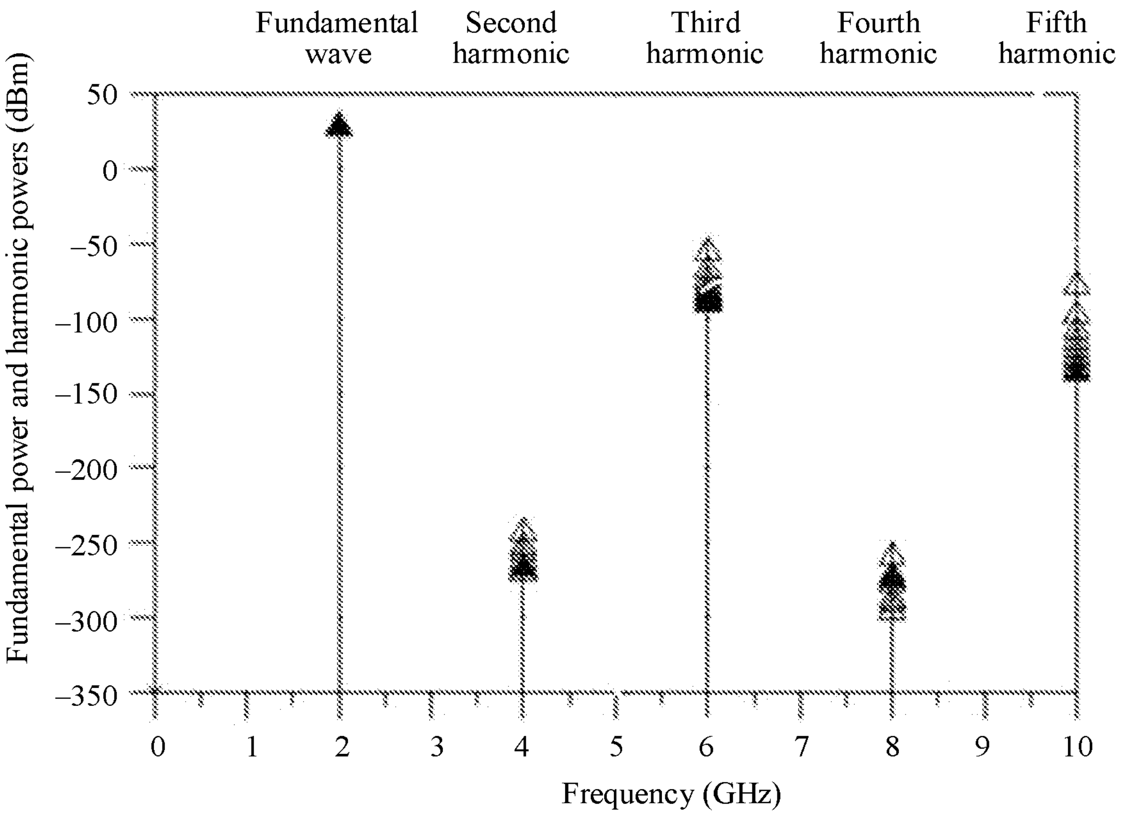
FIG. 4A shows a simulation result of the semiconductor switch device in this embodiment of this application in harmonic balance.
Figure 4B:
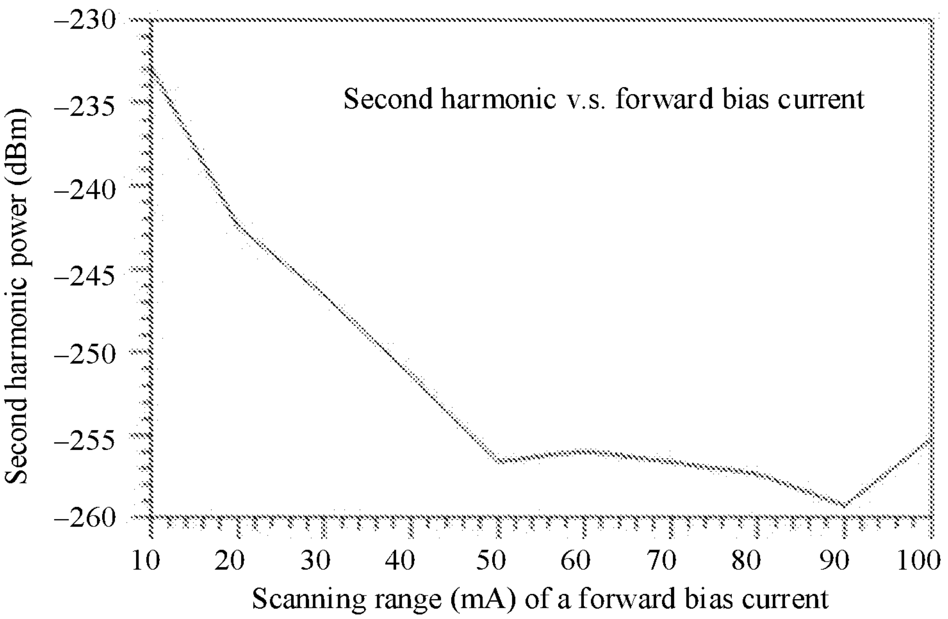
FIG. 4B shows a change trend of the semiconductor switch device in this embodiment of this application with a forward bias current in a second harmonic.

A nonlinear model of the semiconductor switch device is imported to ADS software, and a harmonic balance (Harmonic Balance) simulation engine is used, to perform simulation for a PIN junction in a forward-biased state and a reverse-biased state, to obtain second-harmonic, third-harmonic, fourth-harmonic, and fifth-harmonic nonlinear product spectrums thereof and the like. Simulation is set to a monophonic signal source 2 GHz 38 dBm, input and output impedances are 50 ohms, a scanning range of a forward bias current is 10 mA to 100 mA, and a scanning range of a reverse bias voltage is 50 V to 150 V. First, for the forward-biased state, FIG. 2A shows a harmonic simulation circuit of a single PIN diode in the forward-biased state, and FIG. 2B shows a harmonic simulation circuit of the semiconductor switch device in this embodiment of this application in the forward-biased state. After simulation is performed, simulated structures in FIG. 3A to FIG. 4B are obtained. FIG. 3A shows a simulation result of the single PIN diode in harmonic balance, and FIG. 3B shows a change trend of the single PIN diode with a forward bias current in a second harmonic. FIG. 4A shows a simulation result of the semiconductor switch device in this embodiment of this application in harmonic balance, and FIG. 4B shows a change trend of the semiconductor switch device in this embodiment of this application with a forward bias current in a second harmonic. FIG. 3A is compared with FIG. 4A, and FIG. 3B is compared with FIG. 4B. Comparisons between simulation results show cancellation and compensation effects of harmonic nonlinear products of the single PIN diode and the semiconductor switch device with the area ratio of 1:1 in this embodiment of this application in an ideal case.

Figure 5A:
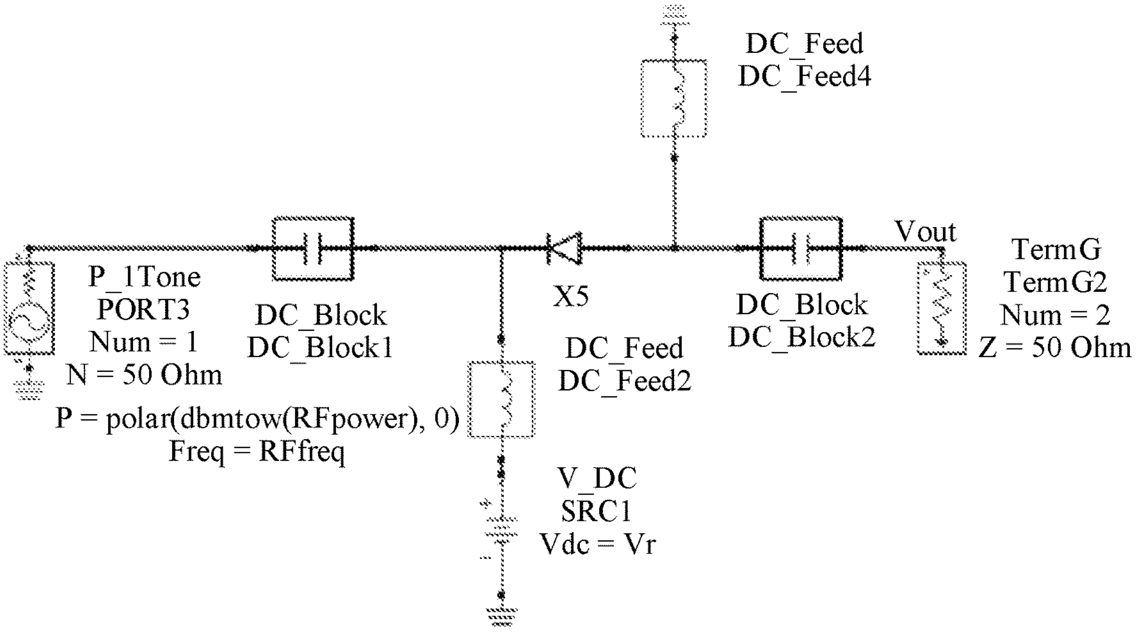
FIG. 5A shows a harmonic simulation circuit of a single PIN diode in a reverse-biased state.
Figure 5B:
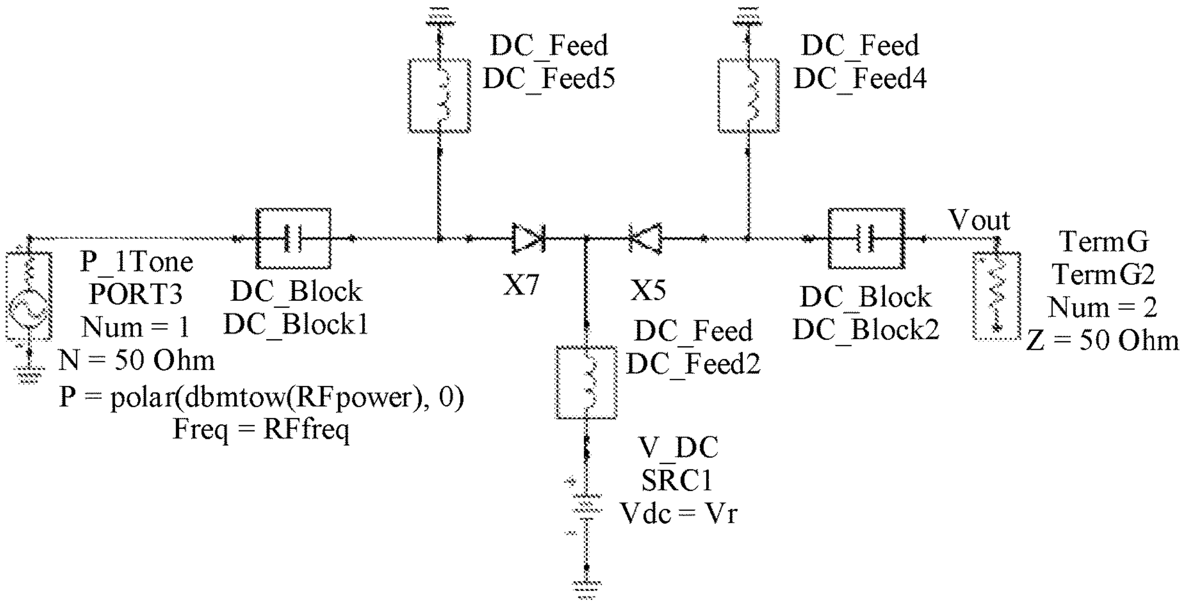
FIG. 5B shows a harmonic simulation circuit of the semiconductor switch device in this embodiment of this application in a reverse-biased state.
Figure 6A:
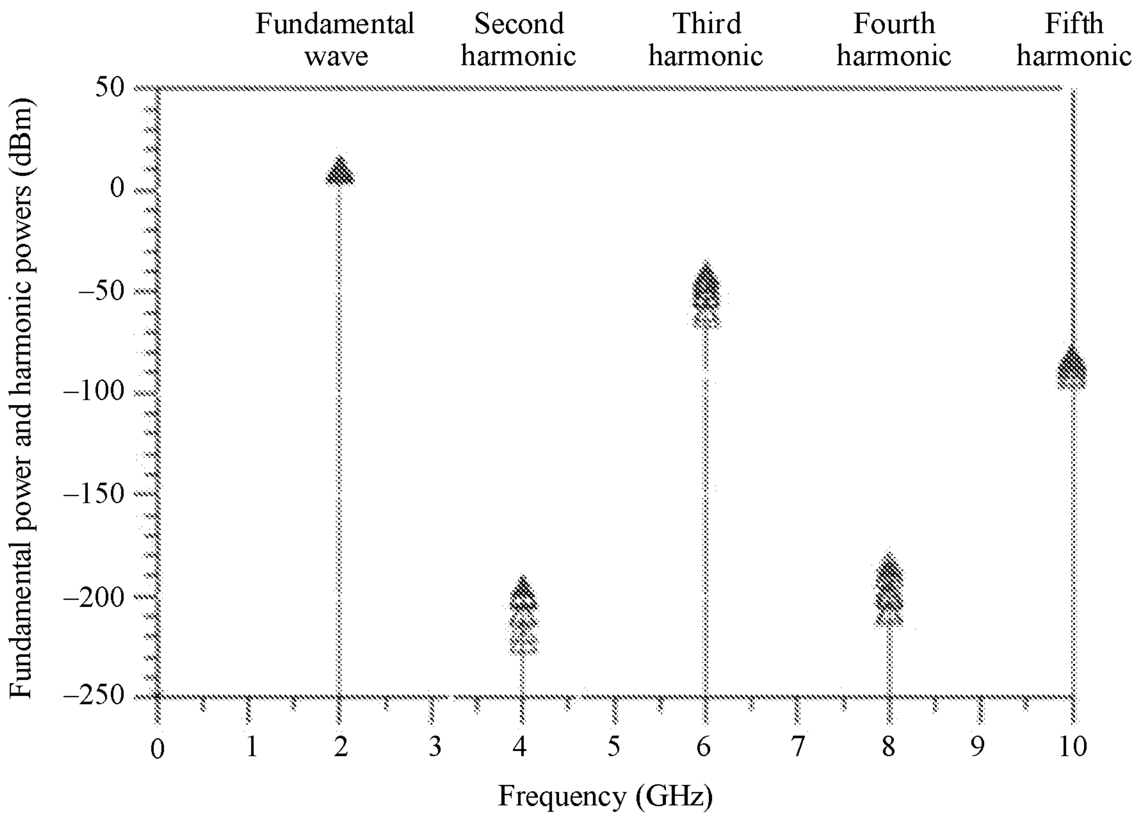
FIG. 6A shows a simulation result of a single PIN diode in harmonic balance.
Figure 6B:
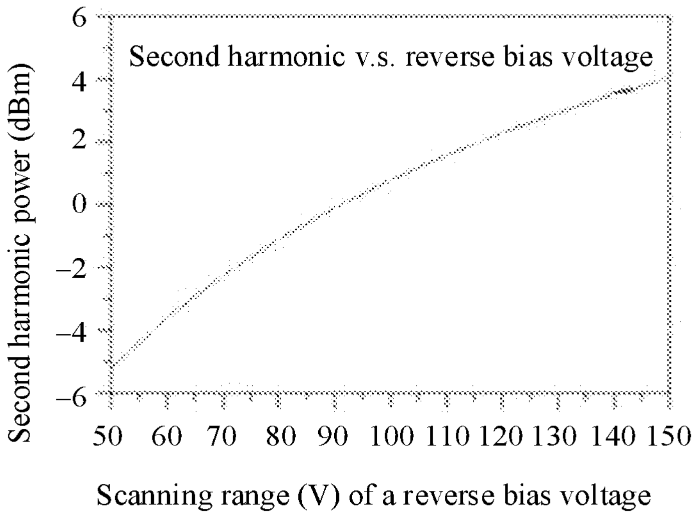
FIG. 6B shows a change trend of a single PIN diode with a reverse bias voltage in a second harmonic.
Figure 7A:
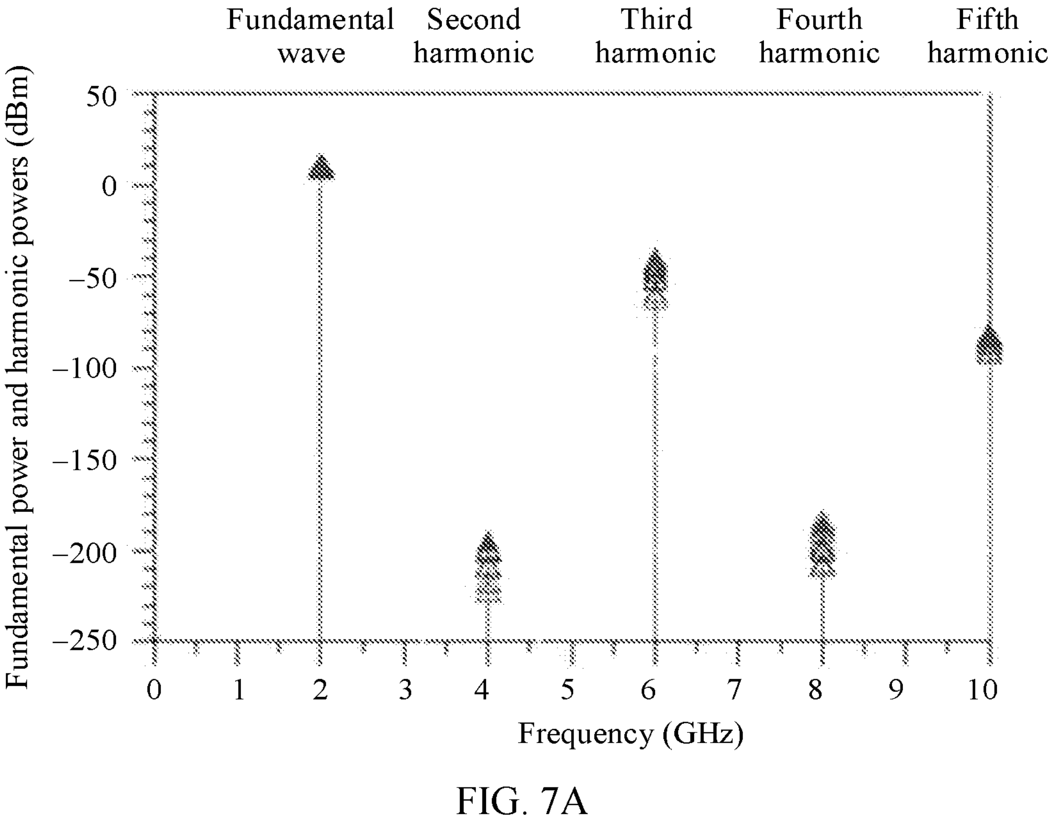
FIG. 7A shows a simulation result of the semiconductor switch device in this embodiment of this application in harmonic balance.
Figure 7B:
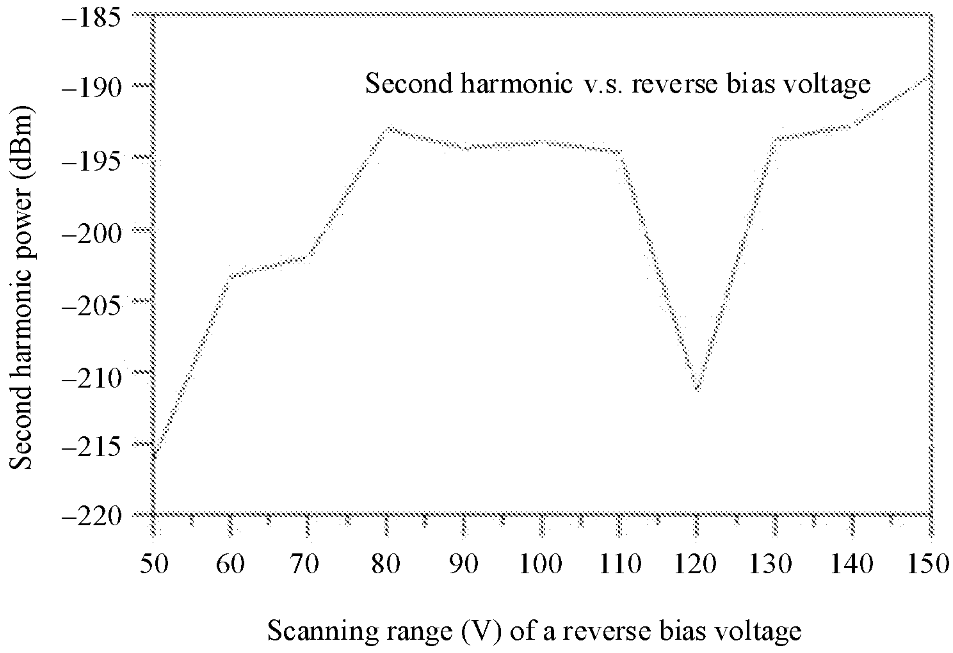
FIG. 7B shows a change trend of the semiconductor switch device in this embodiment of this application with a reverse bias voltage in a second harmonic.

For the reverse-biased state, FIG. 5A shows a harmonic simulation circuit of the single PIN diode in the reverse-biased state, and FIG. 5B shows a harmonic simulation circuit of the semiconductor switch device in this embodiment of this application in the reverse-biased state. After simulation is performed, simulated structures in FIG. 6A to FIG. 7B are obtained. FIG. 6A shows a simulation result of the single PIN diode in harmonic balance, and FIG. 6B shows a change trend of the single PIN diode with a reverse bias voltage in a second harmonic. FIG. 7A shows a simulation result of the semiconductor switch device in this embodiment of this application in harmonic balance, and FIG. 7B shows a change trend of the semiconductor switch device in this embodiment of this application with a reverse bias voltage in a second harmonic. FIG. 6A is compared with FIG. 7A, and FIG. 6B is compared with FIG. 7B. It can be learned from the simulation results that an even harmonic, especially a second harmonic, of the semiconductor switch device in this embodiment of this application is 170 dB to 200 dB lower than that of the single PIN diode. Considering a rounding error of floating-point calculation of the software, this result means that an even harmonic product is perfectly cancelled. Because parameters of the first PIN diode 100 and the second PIN diode 200 in this embodiment of this application can completely match, the semiconductor switch device in this embodiment of this application is improved by 20 dB compared with other PIN diodes, to essentially improve nonlinear cancellation.

A specific area ratio of the first PIN diode 100 to the second PIN diode 200 may be precisely controlled in a manufacturing process, and the ratio may be used as a free factor to adjust a coefficient of nonlinear compensation of the device, thereby increasing design flexibility of the entire semiconductor switch device. During specific setting of the value of N, the value of N is determined based on an application scenario of the semiconductor switch device. Specifically, the value of N is finally determined based on experimental data of design of experiments (DoE). Setting an appropriate value of N can still achieve good linearity when parameters of other parts of the circuit are mismatched.

Figure 8:
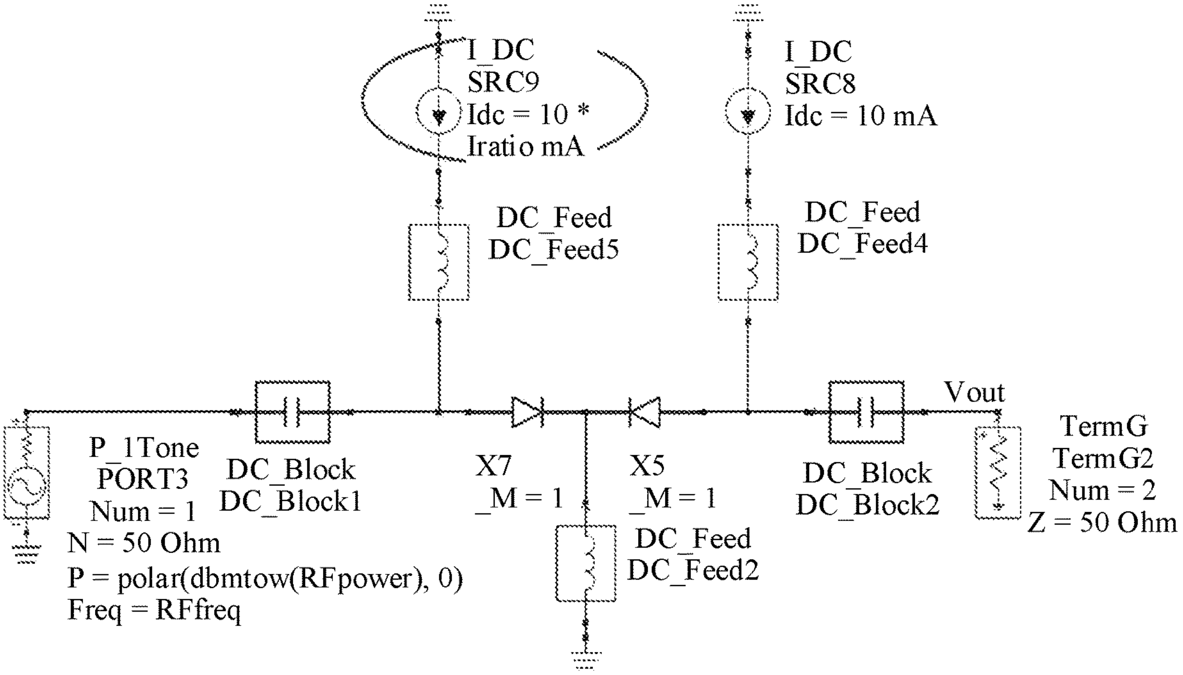
FIG. 8 shows a harmonic simulation circuit of the semiconductor switch device in this embodiment of this application in a case of a forward bias current mismatch.
Figure 9:
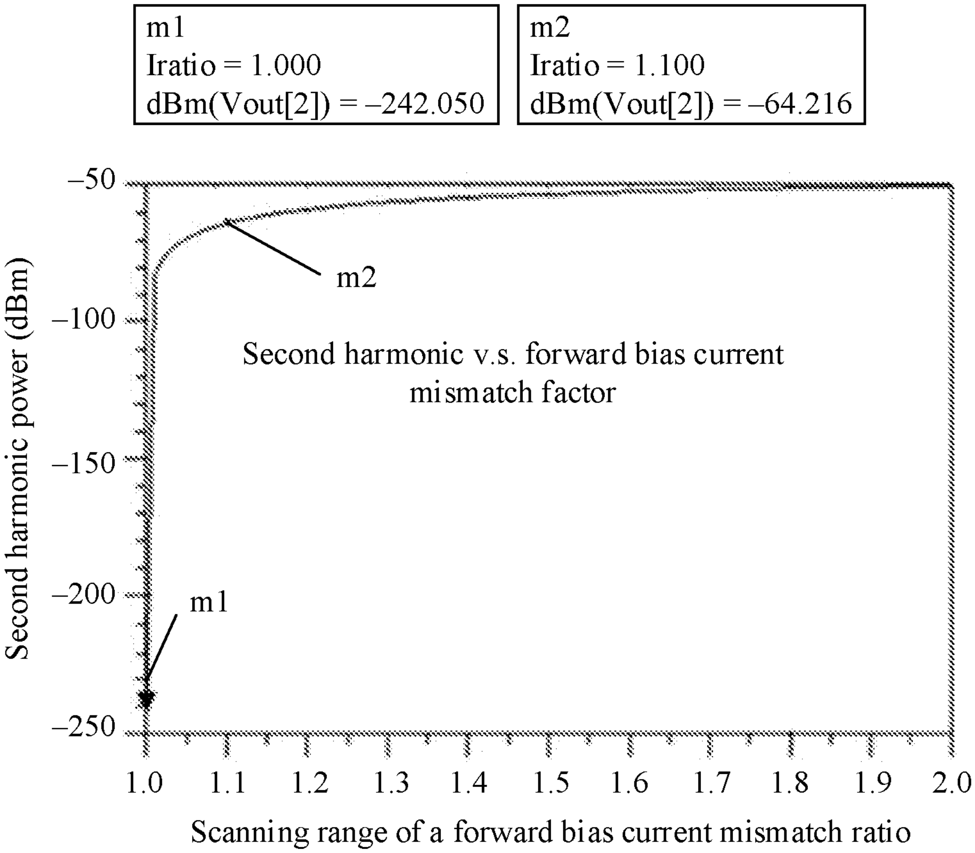
FIG. 9 shows a change trend of the semiconductor switch device with a reverse bias voltage in a second harmonic.
Figure 10:
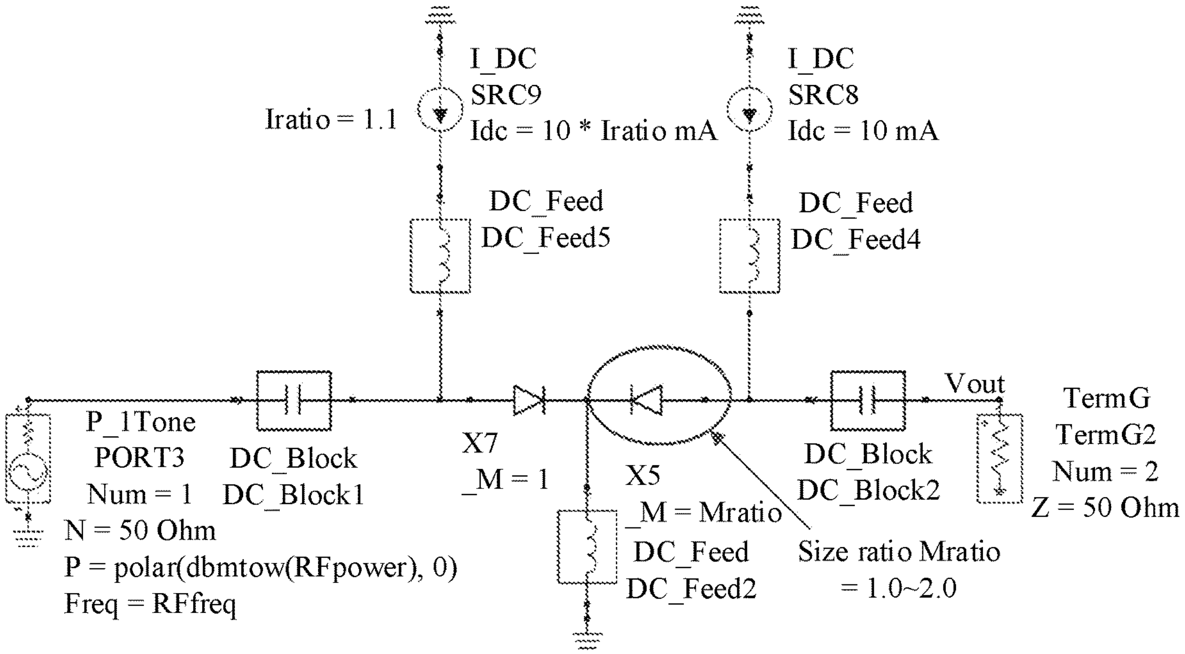
FIG. 10 shows a harmonic simulation circuit for improving linearity by using a size ratio of a PIN junction in a case of a forward bias current mismatch.
Figure 11:
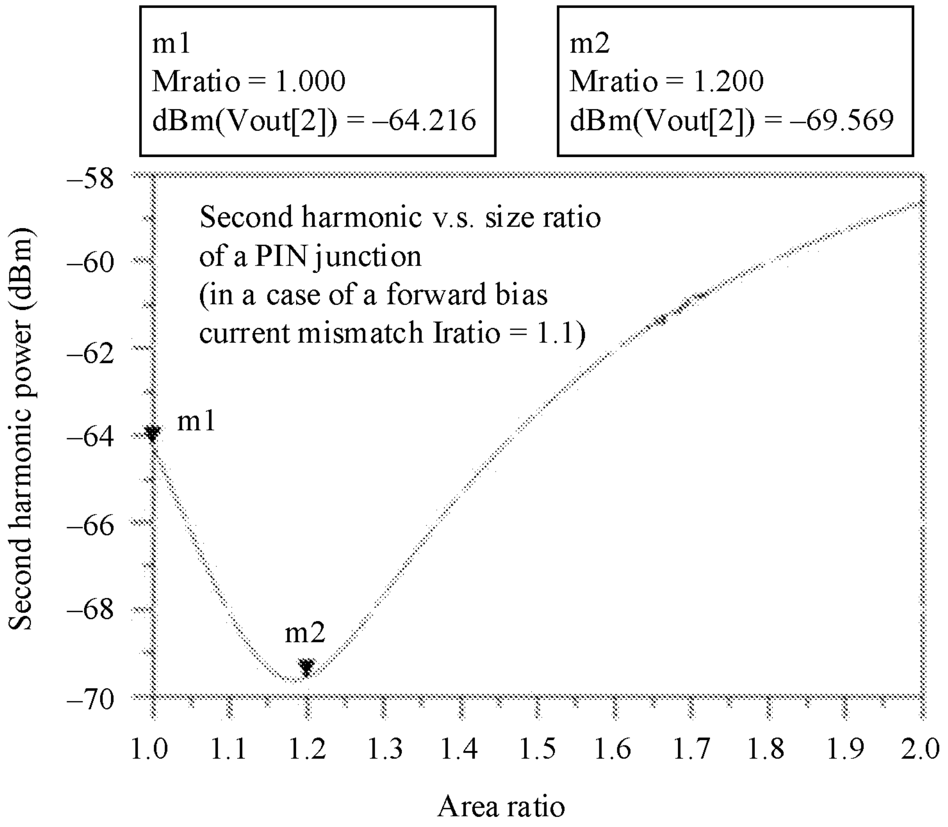
FIG. 11 shows a change trend of a second harmonic with a size ratio of a PIN junction in a case of a forward bias current mismatch Iratio=1.1.

During application of the semiconductor switch device, even if parameters of the first PIN diode 100 and the second PIN diode 200 that are disposed side by side are completely matched, a mismatch may still exist in other parts of the module circuit. As a result, a linearity improvement gain achieved due to complete matching between the parameters of the first PIN diode 100 and the second PIN diode 200 is reduced. The mismatch of the other parts includes a mismatch of a circuit layout, a mismatch of a surface mounted device (SMD), a mismatch of a bias circuit of the PIN junction, and the like. A current mismatch of the bias circuit of the PIN junction is used as an example. It is simulated in advanced design system (ADS) software that a linearity improvement gain is reduced due to the mismatch. FIG. 8 shows a harmonic simulation circuit of the semiconductor switch device in this embodiment of this application in a case of a forward bias current mismatch. During simulation, a reference value of a bias current of the PIN junction is set to 10 mA, but there is a ratio difference (Iratio) between bias currents of the two PIN diodes (the first PIN diode 100 and the second PIN diode 200, where a ratio of the first PIN diode 100 to the second PIN diode 200 is 1:1). A scanning range of the simulation is set to 1.0 to 2.0 (a value of Iratio). FIG. 9 shows a change trend of the semiconductor switch device with a reverse bias voltage in a second harmonic. During simulation, when Iratio deviates from 1.0, in other words, a bias current mismatch exists, a linearity improvement gain is reduced rapidly. When Iratio=1.1, the second harmonic is-54 dBm. Although this is improved by nearly 20 dB compared with −45 dB of a 10 mA biased single PIN diode (namely, the conventional single PIN diode), it is far from an ideal matching status in a case of Iratio=1.0. Therefore, when the mismatch of other parts of the module circuit cannot be avoided, the area ratio of the first PIN diode 100 to the second PIN diode 200 may be actively adjusted to implement compensation. For example, the forward bias current mismatch ratio Iratio is equal to 1.1. FIG. 10 shows a harmonic simulation circuit for improving linearity by using a size ratio of a PIN junction in a case of the forward bias current mismatch. A change trend of the scanning area ratio of the first PIN diode 100 to the second PIN diode 200 in the second harmonic is simulated in the ADS software. As shown in FIG. 11, when the area ratio of the first PIN diode 100 to the second PIN diode 200 is approximately equal to 1.2, the second harmonic is optimal, and is-69.569 dBm, and this is improved by approximately 5 dB compared with the reference value-54 dBm (the area ratio is equal to 1.0), thereby improving a matching effect of the entire module circuit.

During forming of the first PIN diode 100 and the second PIN diode 200, a distance between the first PIN diode 100 and the second PIN diode 200 is 0.1 micrometers (μm) to 5000 μm, to ensure an effect of electrical isolation between the first PIN diode 100 and the second PIN diode 200. The distance between the first PIN diode 100 and the second PIN diode 200 refers to a minimum distance between the second semiconductor layer a102 and the second semiconductor layer b202 and a minimum distance between the first intrinsic layer 103 and the second intrinsic layer 203. To improve an effect of electrical isolation between the first PIN diode 100 and the second PIN diode 200 in the semiconductor switch device, the semiconductor switch device in this embodiment of this application further includes a first insulation layer 40 embedded in the first semiconductor layer 10. The first insulation layer 40 electrically isolates any adjacent PIN diodes. As shown in FIG. 1B, the first insulation layer 40 is partially inserted into the first semiconductor layer 10, and an insertion depth is h. A value of h may be 0 μm to 1000 μm, for example, a depth such as 0 μm, 10 μm, 100 μm, 500 μm, 800 μm, or 1000 μm, to ensure isolation between the first intrinsic layer 103 and the second intrinsic layer 203. A width d of the first insulation layer 40 ranges from 0.1 μm to 5000 μm, for example, is a width such as 0.1 μm, 10 μm, 50 μm, 100 μm, 500 μm, 1000 μm, 3000 μm, or 5000 μm. Certainly, the first insulation layer 40 is an optional component, and may be selectively disposed, or may not be disposed.

Still referring to FIG. 1B, to protect the semiconductor switch device, a second insulation layer 30 is further disposed in the semiconductor switch device in this embodiment of this application, and the second insulation layer 30 is connected to the first insulation layer 40 and covers sidewalls of an intrinsic layer and a second semiconductor layer of any PIN diode. During specific manufacturing, the first insulation layer 40 and the second insulation layer 30 may be of an integral structure, or may be of a split structure. When an integral structure is used, the first insulation layer 40 and the second insulation layer 30 are collectively referred to as an insulation layer, and the insulation layer materials may be made by using different materials, for example, silicon dioxide, or silicon dioxide and silicon nitride. Certainly, the insulation layer may be made by using another insulating material. In a specific embodiment, a window may be formed on the insulation layer. For different area ratios of the first PIN diode 100 to the second PIN diode 200, area ratios between windows on the insulation layer that correspond to the first PIN diode 100 and the second PIN diode 200 are also different.

When the first PIN diode 100 and the second PIN diode 200 are connected to an external circuit, as shown in FIG. 1B, a first pad 101 is disposed on a side of the second semiconductor layer a102 away from the first intrinsic layer 103, a second pad 201 is disposed on a side of the second semiconductor layer b202 away from the second intrinsic layer 203, and a backside metal layer 20 is disposed on a surface of the first semiconductor layer 10 away from the first intrinsic layer 103 and the second intrinsic layer 203. The first pad 101, the second pad 201, and the backside metal layer 20 are led out as electrodes, so that the semiconductor switch device forms a common-cathode or common-anode three-port die, and then a packaging process is performed to finally form a product form of an integral three-port component. The first pad 101, the second pad 201, and the backside metal layer 20 may be manufactured by using a titanium nickel aurum material, a titanium platinum aurum material, a titanium aurum material, or an aluminum material, or may be manufactured by using another conductive material.

Certainly, in addition to a structure based on the foregoing three-port device, another packaging form may also be used, for example, a surface mount type (such as QFN or DFN), a flip chip type, or a beam lead type, to package the first PIN diode 100 and the second PIN diode 200 and implement an electrical connection to the outside.

It can be learned from the foregoing description that a three-port device structure is formed by using the semiconductor switch device provided in this embodiment of this application. For an integral structure, disposing the first PIN diode 100 and the second PIN diode 200 side by side improves an effect of matching between the first PIN diode 100 and the second PIN diode 200. In addition, when this overall integration manner is used, an integration degree is improved and costs are reduced compared with a discrete or multi-die element in other approaches.

For ease of understanding, an embodiment of this application further provides a semiconductor switch device manufacturing method. The manufacturing method includes the following steps: manufacturing a first semiconductor layer and an intrinsic layer, where the first semiconductor layer and the intrinsic layer are stacked, and during specific manufacturing, first, the first semiconductor layer may be manufactured, and then the intrinsic layer is manufactured on a surface of the first semiconductor layer, or first, the intrinsic layer may be manufactured, and then the first semiconductor layer is manufactured on a surface of the intrinsic layer; forming a second semiconductor layer on a surface of the intrinsic layer away from the first semiconductor layer; and etching the second semiconductor layer and the intrinsic layer, to form at least two intrinsic layers and a second semiconductor layer corresponding to each intrinsic layer, where the at least two intrinsic layers have a same thickness, and used materials have a same doping density coefficient, where the first semiconductor layer forms one PIN diode together with each first intrinsic layer and each second semiconductor layer, and any two adjacent PIN diodes are electrically isolated; and the first semiconductor layer is an N+ semiconductor layer, and the second semiconductor layer is a P+ semiconductor layer; or the first semiconductor layer is a P+ semiconductor layer, and the second semiconductor layer is an N+ semiconductor layer.

When the first semiconductor layer 10 uses a different layered structure, correspondingly formed semiconductor switch device is also different. This is described below correspondingly.

As shown in FIG. 12A to FIG. 12G, that the first semiconductor is an N+ semiconductor is used as an example.

Step 1: Manufacture a first semiconductor layer 10, where the first semiconductor layer 10 is an N+ semiconductor layer.

Figure 12A:
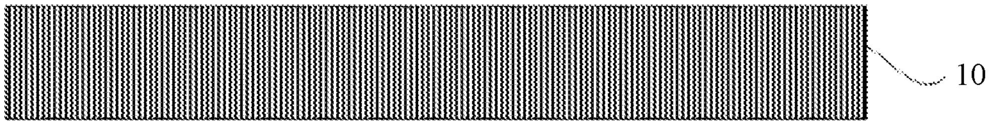
FIG. 12A to FIG. 12G are flowcharts of manufacturing a semiconductor switch device according to an embodiment of this application.

Specifically, as shown in FIG. 12A, an N-type wafer is used as a substrate for manufacturing. Phosphorus is doped to form an N+ doped layer, to obtain the first semiconductor layer 10.

Step 2: Manufacture an intrinsic layer 50.

Figure 12B:
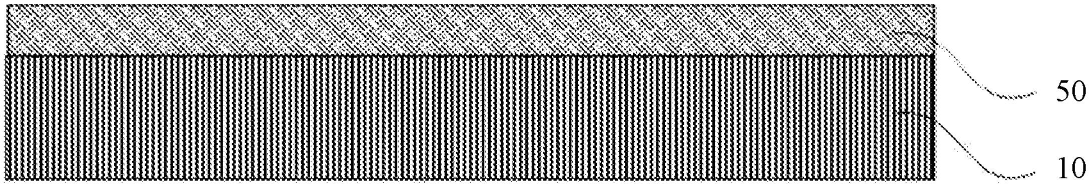

Specifically, as shown in FIG. 12B, the intrinsic layer 50 of a monocrystalline lightly N-doped layer is formed through chemical vapor deposition, diffusion, molecular beam epitaxy, or the like, and a thickness of the intrinsic layer 50 needs to be precisely controlled.

Step 3: Form a second semiconductor layer 60 on the first intrinsic layer 103.

Figure 12C:
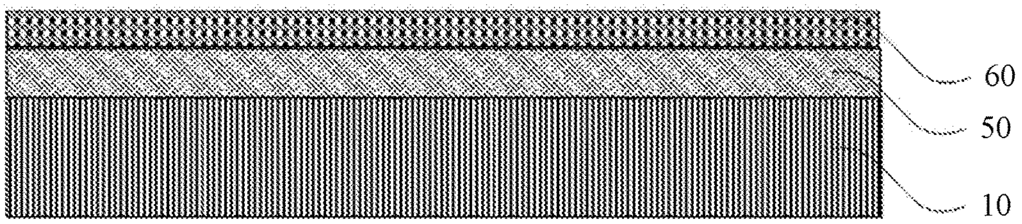

Specifically, as shown in FIG. 12C, a layer of polycrystalline silicon is formed on the intrinsic layer 50 at a high temperature through chemical vapor deposition, and then boron is diffused into the wafer at a high temperature by using a $B_2O_3$ material, to form a P+ doped layer. Alternatively, the second semiconductor layer 60 is formed on the intrinsic layer 50 through diffusion or epitaxial growth. It can be learned from the foregoing description that the second semiconductor layer 60 and the first semiconductor layer 10 are opposite semiconductor layers, and a process implementation method thereof may be but is not limited to diffusion or epitaxial growth.

Step 4: Form a window on the intrinsic layer and the second semiconductor layer through etching.

Figure 12D:
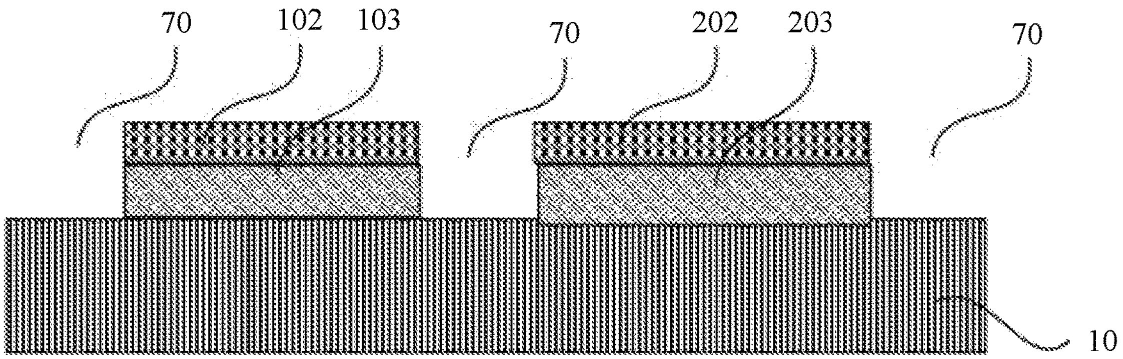

Specifically, as shown in FIG. 12D, the window 70 is formed on the intrinsic layer and the second semiconductor layer through etching, and for the window, the first semiconductor layer 10 needs to be slightly over-etched. The over-etched first semiconductor layer 10 may be 0 micrometers to 1000 micrometers. The etching manner may be dry etching or wet etching. The intrinsic layer is divided into the first intrinsic layer 103 and the second intrinsic layer 203 by the window, and the second semiconductor layer is divided into the second semiconductor layer a102 and the second semiconductor layer b202 by the window. The first semiconductor layer 10, the first intrinsic layer 103, and the second semiconductor layer a102 form a first PIN diode. The first semiconductor layer 10, the second intrinsic layer 203, and the second semiconductor layer b202 form a second PIN diode. In addition, the etched window should ensure electrical isolation between the first PIN diode and the second PIN diode.

Step 5: Deposit an insulation layer in the window.

Figure 12E:
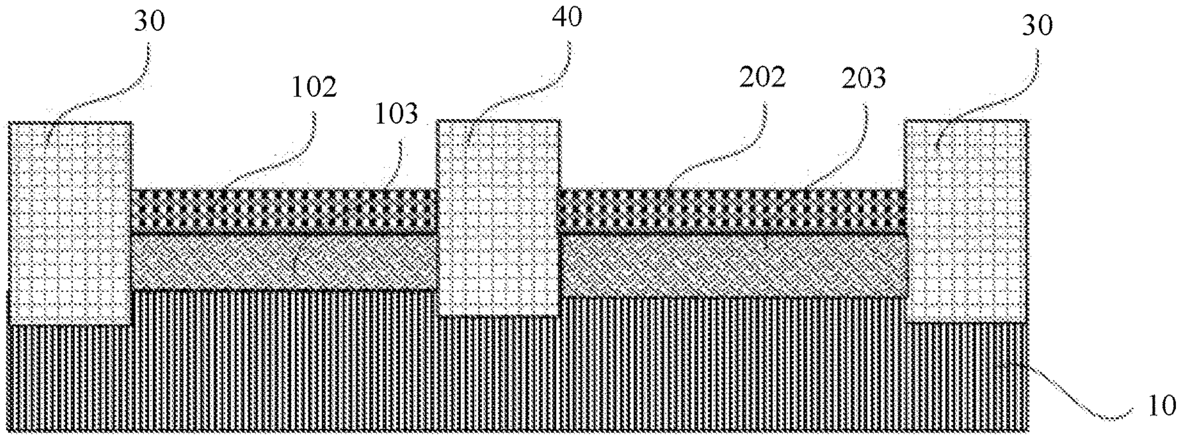

Specifically, as shown in FIG. 12E, silicon dioxide or silicon nitride may be deposited in the window through lift-off, or glass powder may be coated, to form the insulation layer. The insulation layer includes a first insulation layer 40 that isolates the first PIN diode 100 from the second PIN diode 200 and a second insulation layer 30 used to protect exposed sidewalls of the first PIN diode 100 and the second PIN diode 200.

Step 5 is an optional step. In the semiconductor switch provided in this embodiment of this application, the insulation layer is not necessarily disposed.

Step 6: Deposit pads on windows above the second semiconductor layers.

Figure 12F:
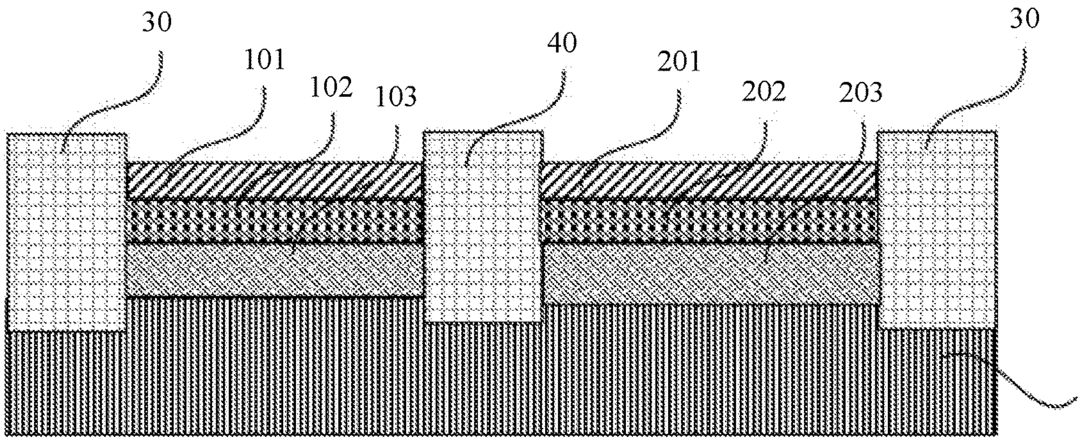

Specifically, as shown in FIG. 12F, the pad is deposited through evaporation, magnetron sputtering, or electroplating, and annealing is performed in mixed gas of nitrogen and hydrogen at a high temperature. A pad corresponding to the first PIN diode is the first pad 101, and a pad corresponding to the second PIN diode is the second pad 201.

Step 7: Deposit backside metal at the bottom of the first semiconductor layer 10.

Figure 12G:
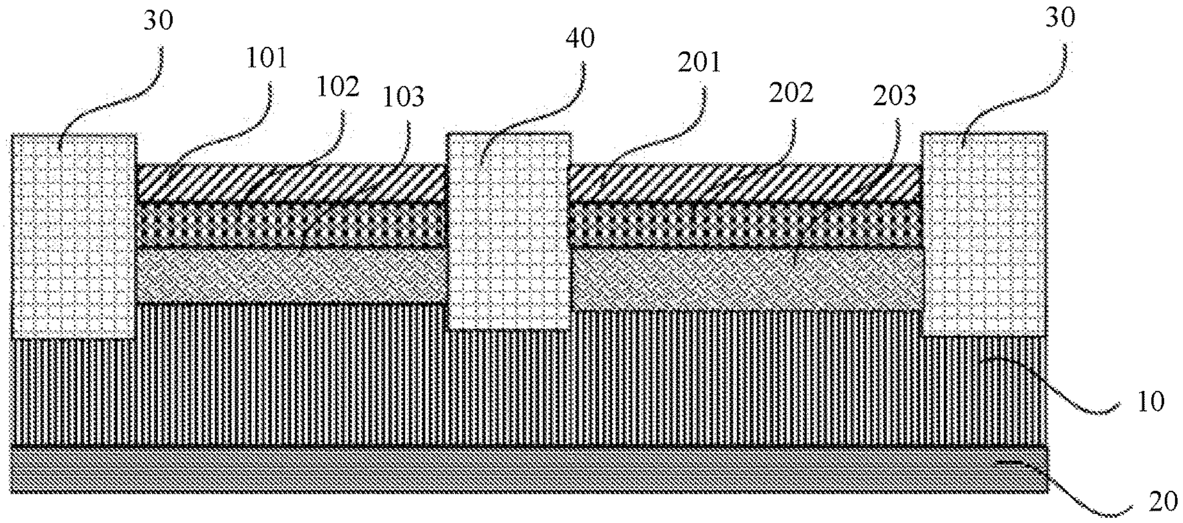

Specifically, as shown in FIG. 12G, after the semiconductor switch device is thinned, a titanium nickel aurum layer, a titanium aurum layer, an aluminum layer, or another metal layer is deposited at the bottom of the first semiconductor layer 10 (a side away from the intrinsic layer), to form the backside metal layer 20. When a different material is used for the backside metal layer 20, a different thickness may be selected. For example, for titanium, a thickness is 0 nanometers to 500 nanometers, for nickel, a thickness is 0 nanometers to 100 nanometers, and for *aurum*, a thickness is 0 micrometers to 500 micrometers.

It should be understood that the foregoing specific manufacturing method is merely used as an example of a process of manufacturing the semiconductor switch device for the Si process, and details such as a specific semiconductor material (for example, GaAs, GaN, or SiC) and a specific doped material (for example, phosphorus) are not limited.

It can be learned from the foregoing description that in the manufactured semiconductor switch device, automatic parameter matching between the two PIN diodes is implemented by using a geometrically symmetric figure with centers of the two PIN diodes aligned, to improve linearity.

In addition, the entire semiconductor switch device has a compact structure, a smaller chip packaging area, and lower costs. In addition, in this application, no process difference is generated during epitaxial growth of the intrinsic layer of the PIN diode and growth of the first semiconductor layer and the second semiconductor layer, and automatic parameter matching between the two PIN diodes is implemented, to improve linearity, and improve an effect of a solid-state phase shifter. Compared with other approaches in which a process of the PIN diode is a bit more complex, and particular requirements are imposed on a device parameter of the process, in this application, a process solution of the PIN diode is simpler, can be compatible with a manufacturing process of a single PIN diode, has lower manufacturing costs, and can also achieve an objective of improving linearity of the PIN diode and the solid-state phase shifter.

As shown in FIG. 13A to FIG. 13F, an embodiment of this application further provides another semiconductor manufacturing method. The method specifically includes the following steps.

That the first semiconductor is an N+ semiconductor is used as an example.

Step 1: Manufacture a first semiconductor layer 10, where the first semiconductor layer 10 is an N+ semiconductor layer.

Figure 13A:
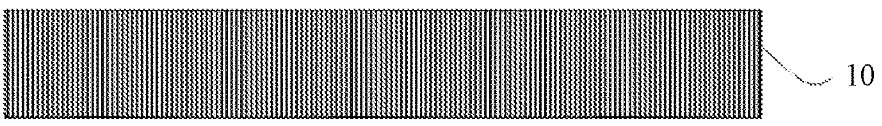
FIG. 13A to FIG. 13F are flowcharts of manufacturing another semiconductor switch device according to an embodiment of this application.

Specifically, as shown in FIG. 13A, an N-type wafer is used as a substrate for manufacturing. Phosphorus is doped to form an N+ doped layer, to obtain the first semiconductor layer 10.

Step 2: Deposit an insulation layer on a surface of the first semiconductor layer 10, and form, on the insulation layer, windows reserved for PIN diodes.

Figure 13B:
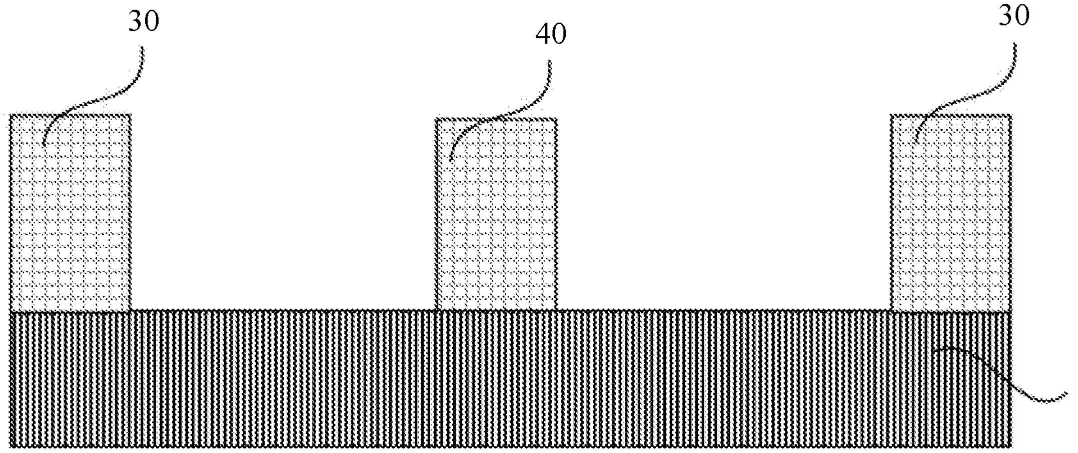

Specifically, as shown in FIG. 13B, a relatively thick silicon dioxide insulation layer is formed on a top layer of the wafer through thermochemical vapor deposition. Silicon dioxide is selectively removed, by using a mask and photoresist, in regions on which intrinsic layers need to be formed, to form the windows. In FIG. 13B, two windows are formed, the two windows are respectively used to accommodate a first PIN diode and a second PIN diode, and the insulation layer is divided into a first insulation layer 40 used to isolate the first PIN diode from the second PIN diode and a second insulation layer 30 used to protect exposed sidewalls of the first PIN diode and the second PIN diode.

Step 3: Manufacture the intrinsic layers in the window.

Figure 14A:
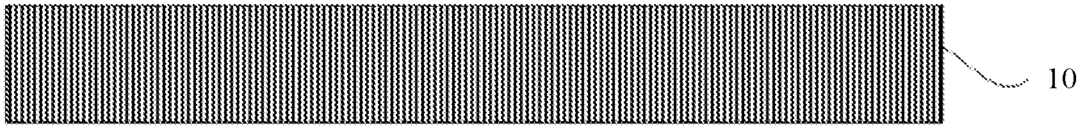
FIG. 14A to FIG. 14G are flowcharts of manufacturing a third semiconductor switch device according to an embodiment of this application.
Figure 14B:
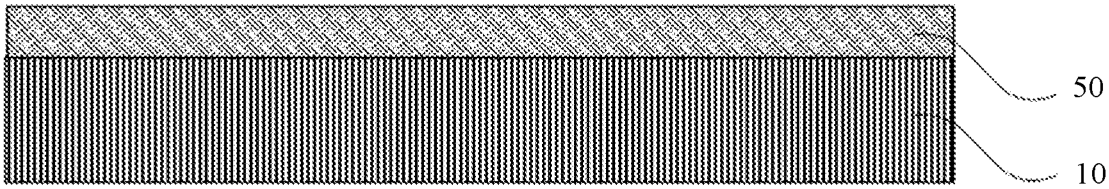
Figure 14C:
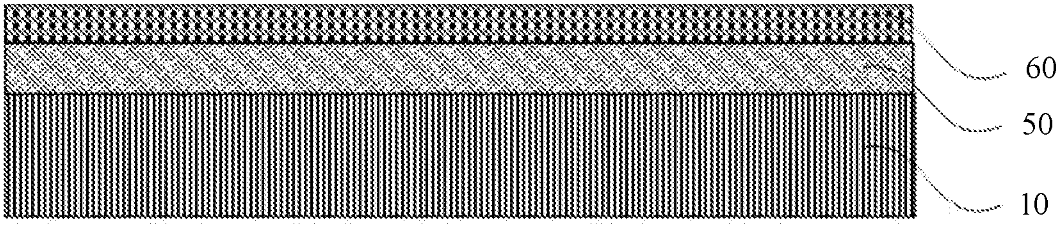

Specifically, as shown in FIG. 14C, after lift-off, the intrinsic layer of a monocrystalline lightly N-doped layer is formed in each of the two windows of the insulation layer on the top layer of the wafer through chemical vapor deposition, diffusion, molecular beam epitaxy, or the like. A thickness of the intrinsic layer needs to be precisely controlled. An intrinsic layer corresponding to the first PIN diode is the first intrinsic layer 103, and an intrinsic layer corresponding to the second PIN diode is the second intrinsic layer 203.

Step 4: Form second semiconductor layers on the intrinsic layers.

Figure 13C:
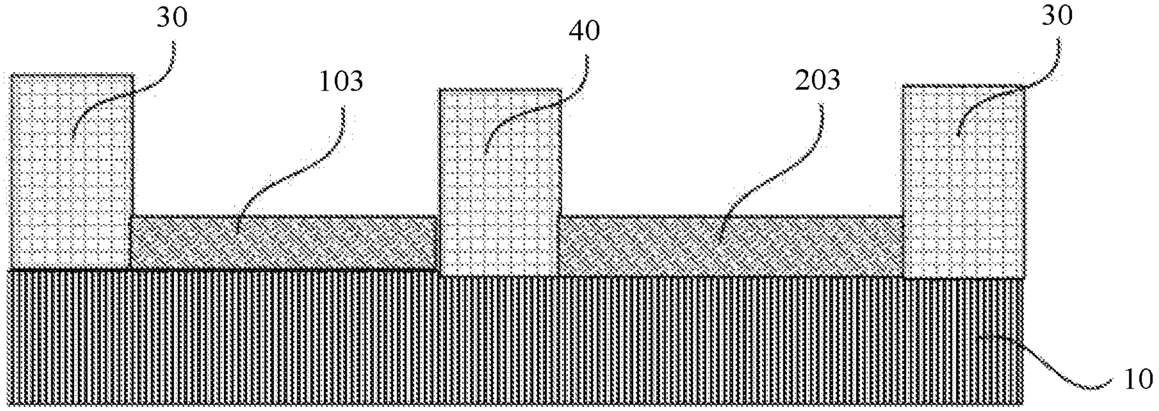
Figure 13D:
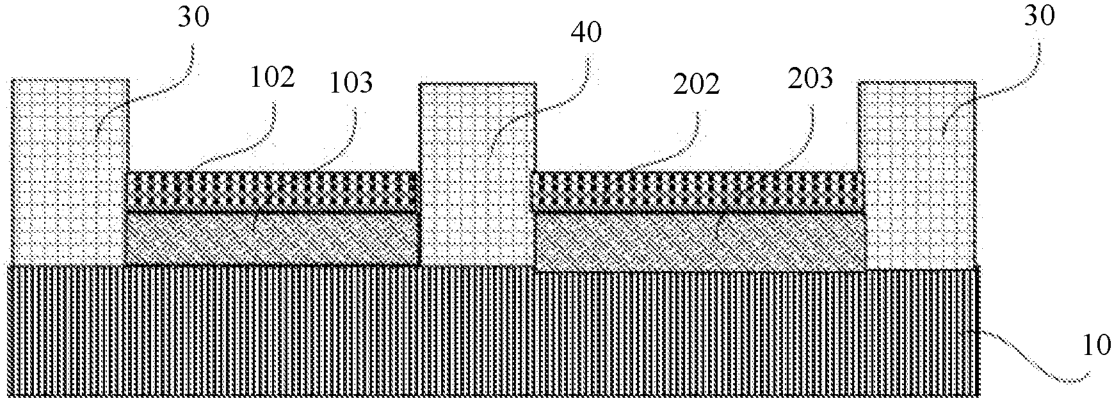

Specifically, as shown in FIG. 13C, after lift-off, a layer of polycrystalline silicon is formed on each of the intrinsic layers (the first intrinsic layer 103 and the second intrinsic layer 203) at a high temperature through chemical vapor deposition, and then boron is diffused into the wafer at a high temperature by using a $B_2O_3$ material, to form a P+ doped layer. Alternatively, the second semiconductor layer is formed on each of the intrinsic layers (the first intrinsic layer 103 and the second intrinsic layer 203) through diffusion or epitaxial growth. In addition, the second semiconductor layer and the first semiconductor layer 10 are opposite semiconductor layers, and a process implementation method thereof may be but is not limited to diffusion and epitaxial growth. A second semiconductor layer corresponding to the first PIN diode is the second semiconductor layer a102, and a semiconductor layer corresponding to the second PIN diode is the second semiconductor layer b202.

Step 5: Deposit pads on windows above the second semiconductor layer.

Figure 13E:
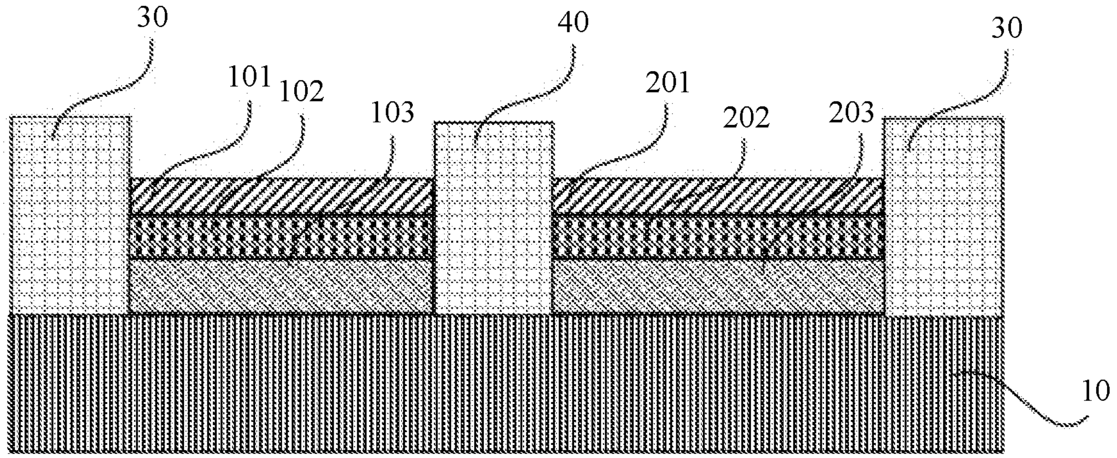

Specifically, as shown in FIG. 13E, the first pad 101 and the second pad 201 are deposited through evaporation, magnetron sputtering, or electroplating, and annealing is performed in a mixed gas of nitrogen and hydrogen at a high temperature. The first pad 101 is deposited on a side of the second semiconductor layer a102 away from the first intrinsic layer 103, and the second pad 201 is deposited on a side of the second semiconductor layer b202 away from the second intrinsic layer 203.

Step 6: Deposit backside metal at the bottom of the first semiconductor layer 10.

Figure 13F:
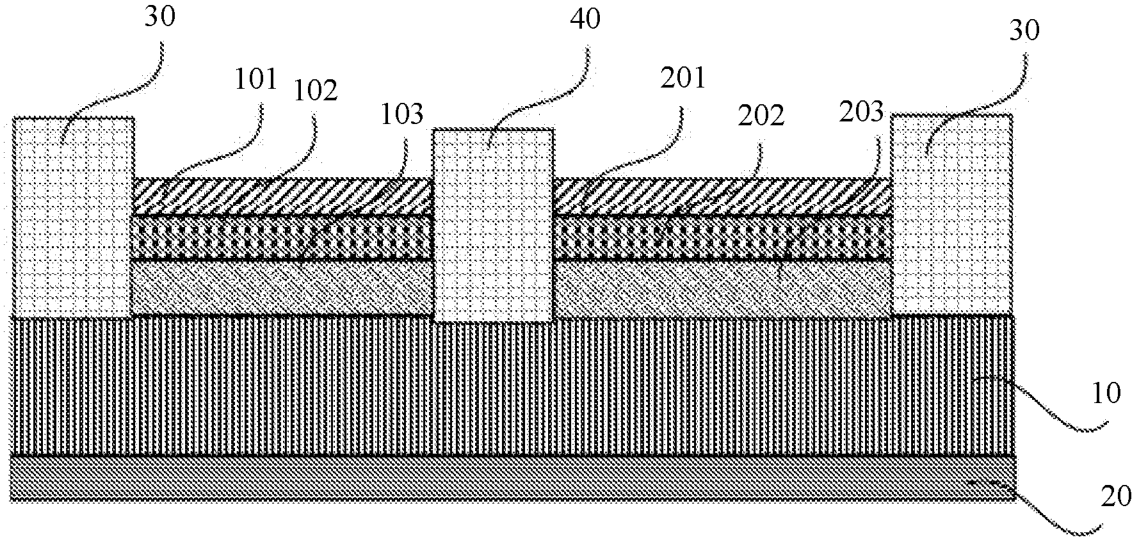

Specifically, as shown in FIG. 13F, after the semiconductor switch device is thinned, a titanium nickel aurum layer, a titanium aurum layer, an aluminum layer, or another metal layer is deposited at the bottom of the first semiconductor layer 10 (a side away from the intrinsic layer), to form the backside metal layer 20. When a different material is used for the backside metal layer 20, a different thickness may be selected. For example, for titanium, a thickness is 0 nanometers to 500 nanometers, for nickel, a thickness is 0 nanometers to 100 nanometers, and for aurum, a thickness is 0 micrometers to 500 micrometers.

It should be understood that the foregoing specific manufacturing method is merely used as an example of a process of manufacturing the semiconductor switch device for the Si process, and details such as a specific semiconductor material (for example, GaAs, GaN, or SiC) and a specific doped material (for example, phosphorus) are not limited.

For ease of understanding, detailed description is provided below again by using a semiconductor switch device manufacturing method shown in FIG. 14A to FIG. 14G as an example.

That the first semiconductor is an N+ semiconductor is used as an example.

Step 1: Manufacture a first semiconductor layer 10, where the first semiconductor layer 10 is an N+ semiconductor layer.

Specifically, as shown in FIG. 14A, an N-type wafer is used as a substrate for manufacturing. Phosphorus is doped to form an N+ doped layer, to obtain the first semiconductor layer 10.

Step 2: Deposit an intrinsic layer 50 on a surface of the first semiconductor layer 10.

Specifically, as shown in FIG. 14B, the intrinsic layer 50 of a monocrystalline lightly N-doped layer is formed in a window of an insulation layer on a top layer of the wafer through chemical vapor deposition, diffusion, molecular beam epitaxy, or the like. A thickness of the intrinsic layer 50 needs to be precisely controlled.

Step 3: Form a second semiconductor layer 60 on the intrinsic layer 50.

Specifically, as shown in FIG. 14C, a layer of polycrystalline silicon is formed on the intrinsic layer 50 at a high temperature through a chemical vapor deposition, and then boron is diffused into the wafer at a high temperature by using a $B_2O_3$ material, to form a P+ doped layer. Alternatively, the second semiconductor layer 60 is formed on the intrinsic layer 50 through diffusion, epitaxial growth, or ion implantation. It can be learned from the foregoing description that the second semiconductor layer 60 and the first semiconductor layer 10 are opposite semiconductor layers, and a process implementation method thereof may be but is not limited to diffusion or epitaxial growth.

Step 4: Form a window 70 on the second semiconductor layer 60 and the intrinsic layer 50 through etching after lift-off, to form a first PIN diode and a second PIN diode.

Figure 14D:
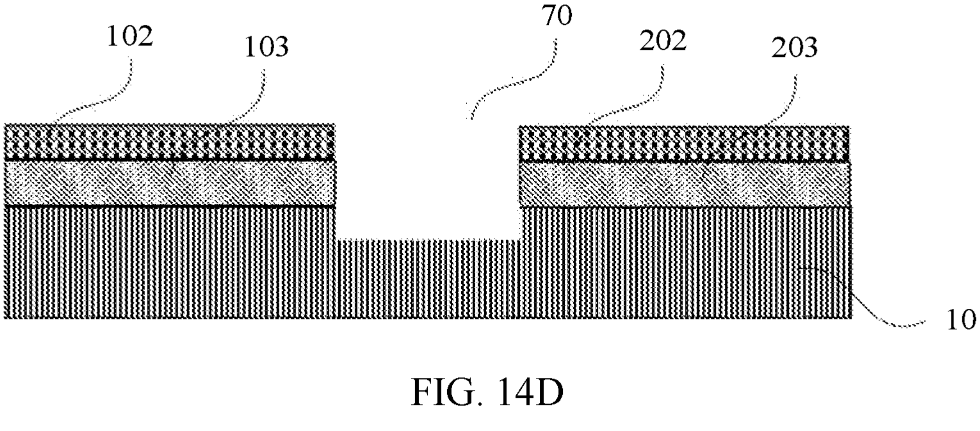

Specifically, as shown in FIG. 14D, the second semiconductor layer and the intrinsic layers are etched at the window after lift-off (The intrinsic layer may be over-etched, and an over-etching depth is 0 μm to 1000 μm), and the etching manner may be dry etching or wet etching. The intrinsic layer is divided into the first intrinsic layer 103 and the second intrinsic layer 203 by the window 70, and the second semiconductor layer is divided into the second semiconductor layer a102 and the second semiconductor layer b202 by the window 70. The first semiconductor layer 10, the first intrinsic layer 103, and the second semiconductor layer a102 form a first PIN diode. The first semiconductor layer 10, the second intrinsic layer 203, and the second semiconductor layer b202 form a second PIN diode. In addition, the etched window 70 should ensure electrical isolation between the first PIN diode 100 and the second PIN diode 200.

Step 5: Form an insulation layer 80 on a surface of the semiconductor switch device, and then form, on a surface of each of the first PIN diode and the second PIN diode through etching after lift-off, a window reserved for a pad.

Figure 14E:
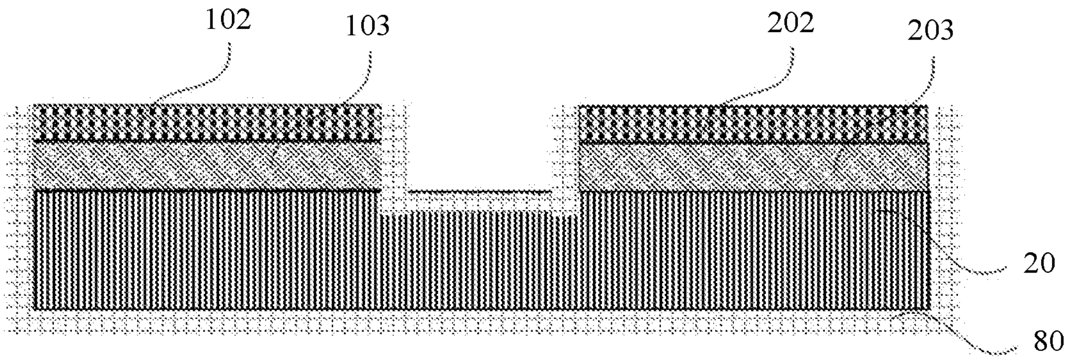

Specifically, as shown in FIG. 14E, the insulation layer 80 is formed on the surface of the semiconductor switch device through thermal oxidation or chemical vapor deposition. Then, the window reserved for depositing the pad is formed on the surface of each of the first PIN diode and the second PIN diode through etching after lift-off. Composition of the insulation layer may be $SiO_2$, $Si_3N_4$, or a multi-layer structure including $SiO_2$ and $Si_3N_4$.

Step 5 is an optional step. In the semiconductor switch provided in this embodiment of this application, the insulation layer is not necessarily disposed.

Step 6: Deposit pads in the windows on the first PIN diode and the second PIN diode.

Figure 14F:
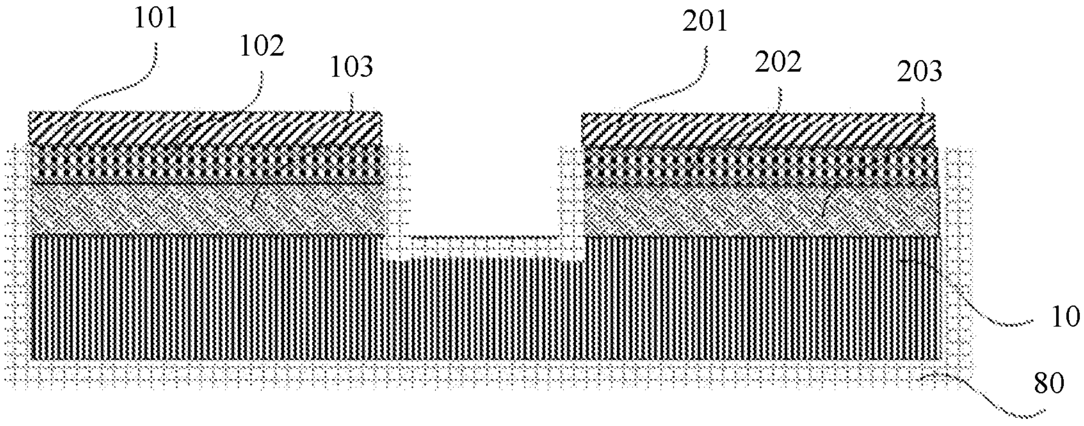

Specifically, as shown in FIG. 14F, after lift-off, the first pad 101 and the second pad 201 are deposited on the surfaces of the first PIN diode and the second PIN diode through evaporation, magnetron sputtering, or electroplating, and annealing is performed in mixed gas of nitrogen and hydrogen at a high temperature.

Step 7: Deposit backside metal at the bottom of the first semiconductor layer 10.

Figure 14G:
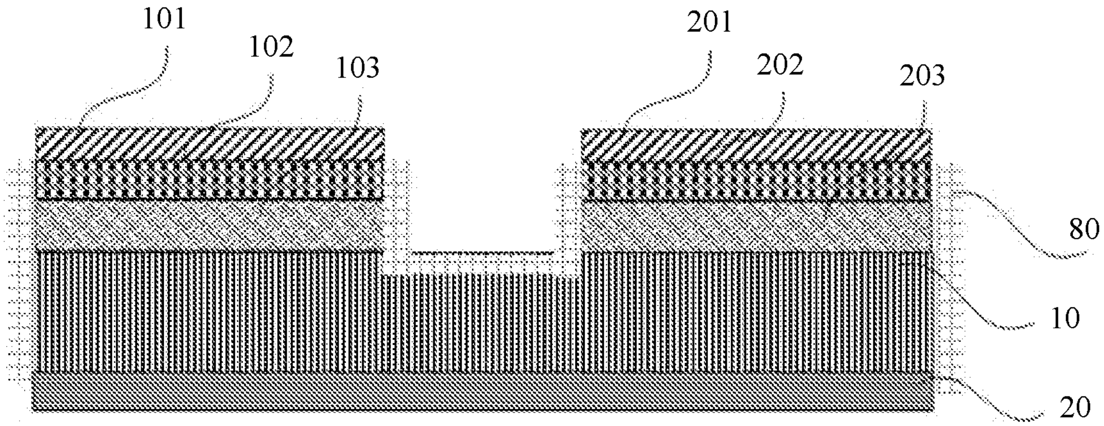

Specifically, as shown in FIG. 14G, after the semiconductor switch device is thinned, a titanium nickel aurum layer, a titanium aurum layer, an aluminum layer, or another metal layer is deposited at the bottom of the first semiconductor layer 10 (a side away from the intrinsic layer), to form the backside metal layer 20. When a different material is used for the backside metal layer 20, a different thickness may be selected. For example, for titanium, a thickness is 0 nanometers to 500 nanometers, for nickel, a thickness is 0 nanometers to 100 nanometers, and for *aurum*, a thickness is 0 micrometers to 500 micrometers.

It should be understood that the foregoing specific manufacturing method is merely used as an example of a process of manufacturing the semiconductor switch device for the Si process, and details such as a specific semiconductor material (for example, GaAs, GaN, or SiC) and a specific doped material (for example, phosphorus) are not limited.

In the foregoing manufacturing method, during specific manufacturing of the first PIN diode and the second PIN diode, an area ratio of a first surface of each first PIN diode to a second surface of each second PIN diode is 1:N, where N is a rational number greater than or equal to 1. The first surface is an effective area of doped particles in a surface of the second semiconductor layer of the first PIN diode away from the first semiconductor layer. The second surface is an effective area of doped particles in a surface of the second semiconductor layer of the second PIN diode away from the first semiconductor layer. For details, refer to related descriptions in FIG. 2.

It can be learned from the foregoing specific manufacturing method that a three-port device structure is formed by using the semiconductor switch device provided in this embodiment of this application. For an integral structure, disposing the first PIN diode and the second PIN diode side by side improves an effect of matching between the first PIN diode and the second PIN diode. In addition, when this integration manner is used, an integration degree is improved and costs are reduced compared with a discrete or multi-die element in other approaches.

In addition, this application further provides a solid-state phase shifter. The solid-state phase shifter includes the foregoing semiconductor switch devices located on a plurality of branch circuits, and each branch circuit includes at least one semiconductor switch device. When two or more semiconductor switch devices are used, the two or more semiconductor switch devices may be connected in series, connected in parallel, or partially connected in series and partially connected in parallel. This is not specifically limited herein. In addition, the semiconductor switch device is connected or disconnected, to generate a phase difference between radio frequency signals transmitted on the plurality of branch circuits. The used semiconductor switch device uses a geometrically symmetric figure with centers of the two PIN diodes aligned, to implement automatic parameter matching between the two PIN diodes, thereby improving linearity, and improving an effect of the solid-state phase shifter.

The foregoing descriptions are merely specific implementations of this application, but the protection scope of this application is not limited thereto. The protection scope of this application may also be a plurality of PIN diodes of an array structure. When the plurality of PIN diodes of the array structure is used, at least two intrinsic layers are disposed on a same surface of the first semiconductor layer, and a second semiconductor layer is disposed on each intrinsic layer. The at least two intrinsic layers have a same thickness, and used materials have a same doping density coefficient. The second semiconductor layers are in a one-to-one correspondence with the intrinsic layers, and each corresponding second semiconductor layer and intrinsic layer and the first semiconductor layer form one PIN diode.

Figure 15:
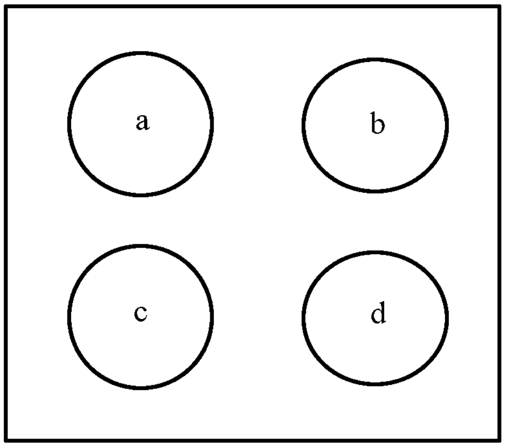
FIG. 15 is a top view of another semiconductor switch device according to an embodiment of this application.
Figure 16:
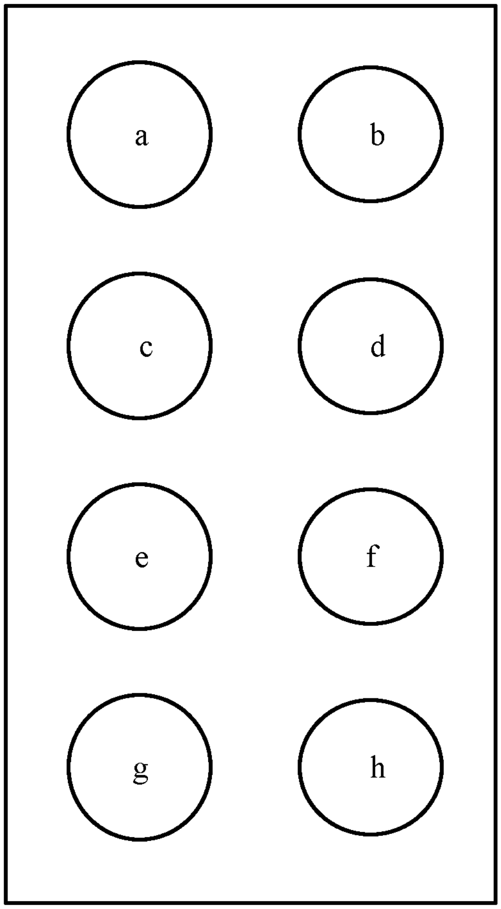
FIG. 16 is a top view of another semiconductor switch device according to an embodiment of this application.

In addition, an embodiment of this application further provides a massive MIMO antenna array. The antenna array includes the foregoing solid-state phase shifter and a plurality of antenna units, and the solid-state phase shifter is configured to change a phase relationship between the plurality of antenna units. A semiconductor switch device of the used solid-state phase shifter uses a geometrically symmetric figure with centers of two or more PIN diodes aligned, to implement automatic parameter matching between the plurality of PIN diodes, thereby improving linearity, and improving a use effect of the antenna array. The PIN diodes may be in an array mode, for example, integration of two, four, eight, or a plurality of PIN diodes, and a top view thereof is shown in FIG. 15. FIG. 15 is a four-PIN diode mode. Opening areas of a and d are equal, opening areas of b and c are equal, an opening area ratio of a to b is 1:N, an opening area ratio of d to c is 1:N, and N is a positive real number. FIG. 16 shows an eight-PIN diode mode. Opening areas of a and d are equal, opening areas of b and c are equal, opening areas of e and h are equal, opening areas of f and g are equal, an opening area ratio of a to b is 1:N, an opening area ratio of d to c is 1:N, an opening area ratio of e to f is 1:N, an opening area ratio of h to g is 1:N, and N is a positive real number.

An embodiment of this application provides a communications device. The communications device includes the massive multiple-input multiple-output antenna array and a radio frequency signal transceiver. The massive multiple-input multiple-output antenna array is configured to receive a radio frequency signal sent by the radio frequency signal transceiver, or configured to send a radio frequency signal to the radio frequency signal transceiver. Using the antenna array improves a communication effect of the communications device.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A semiconductor switch device, comprising:

intrinsic layers, wherein each intrinsic layer of the intrinsic layers has a same thickness and a same doping density coefficient as each other intrinsic layer of the intrinsic layers;

a first semiconductor layer;

a backside metal layer disposed on a bottom side of the first semiconductor layer opposite to the intrinsic layers, wherein the backside metal layer comprises a titanium nickel aurum material, a titanium platinum aurum material, or a titanium aurum material;

second semiconductor layers stacked in a sandwich structure and in a one-to-one correspondence with the intrinsic layers, wherein each second semiconductor layer of the second semiconductor layers is stacked on a side of a corresponding intrinsic layer of the intrinsic layers that is away from the first semiconductor layer, wherein the first semiconductor layer, the intrinsic layers, and the second semiconductor layers form a plurality of P-type, intrinsic, N-type (PIN) diodes, and wherein each PIN diode of the plurality of PIN diodes comprises a respective portion of the first semiconductor layer, a respective intrinsic layer of the intrinsic layers, and a respective second semiconductor layer of the second semiconductor layers;

a plurality of pads disposed on top of the second semiconductor layers away from the intrinsic layers and configured to serve as external electrodes of the semiconductor switch device; and a first insulation layer embedded in the first semiconductor layer and configured to electrically isolate adjacent intrinsic layers from each other and adjacent second semiconductor layers from each other such that adjacent PIN diodes of the plurality of PIN diodes are electrically isolated from each other, wherein the first semiconductor layer is an N+ semiconductor layer and the second semiconductor layers are P+ semiconductor layers.

2. The semiconductor switch device of claim 1, wherein shapes of the second semiconductor layers and the intrinsic layers are centrosymmetric shapes.

3. The semiconductor switch device of claim 1, wherein the plurality of PIN diodes comprises at least one first PIN diode and at least one second PIN diode, wherein an area ratio of a first surface of each first PIN diode of the at least one first PIN diode to a second surface of each second PIN diode of the at least one second PIN diode is 1:N, wherein N is a rational number greater than or equal to 1, wherein the first surface of each first PIN diode is of the respective second semiconductor layer of the first PIN diode, is away from the first semiconductor layer, and corresponds to a first effective area of first doped particles in the first surface, and wherein the second surface of each second PIN diode is of the respective second semiconductor layer of the second PIN diode, is away from the first semiconductor layer, and corresponds to a second effective area of second doped particles in the second surface.

4. The semiconductor switch device of claim 1, wherein each PIN diode of the plurality of PIN diodes comprises respective sidewalls formed by first surfaces of the respective intrinsic layer of the PIN diode and second surfaces of the respective second semiconductor layer of the PIN diode, and wherein the semiconductor switch device further comprises a second insulation layer that is coupled to the first insulation layer and that covers the respective sidewalls of the plurality of PIN diodes.

5. The semiconductor switch device of claim 1, wherein the intrinsic layers are portions of a first wafer, and wherein the second semiconductors are portions of a second wafer.

6. The semiconductor switch device of claim 1, wherein the first insulation layer comprises a silicon dioxide material.

7. The semiconductor switch device of claim 1, wherein the first insulation layer comprises a silicon nitride material.

8. The semiconductor switch device of claim 1, wherein the pads comprise a material formed by evaporation, magnetron sputtering, or electroplating.

9. The semiconductor switch device of claim 8, wherein the pads comprise a titanium nickel aurum material.

10. The semiconductor switch device of claim 8, wherein the pads comprise a titanium platinum aurum material.

11. The semiconductor switch device of claim 8, wherein the pads comprise a titanium aurum material.

12. The semiconductor switch device of claim 8, wherein the pads comprise an aluminum material.

13. A solid-state phase shifter, comprising:

a plurality of semiconductor switch devices, wherein each semiconductor switch device of the plurality of semiconductor switch devices comprises:

intrinsic layers, wherein each intrinsic layer of the intrinsic layers has a same thickness and a same doping density coefficient as each other intrinsic layer of the intrinsic layers;

a first semiconductor layer;

a backside metal layer disposed on a bottom side of the first semiconductor layer opposite to the intrinsic layers, wherein the backside metal layer comprises a titanium nickel aurum material, a titanium platinum aurum material, or a titanium aurum material;

second semiconductor layers stacked in a sandwich structure and in a one-to-one correspondence with the intrinsic layers, wherein each second semiconductor layer of the second semiconductor layers is stacked on a side of a corresponding intrinsic layer of the intrinsic layers that is away from the first semiconductor layer, wherein the first semiconductor layer, the intrinsic layers, and the second semiconductor layers form a plurality of P-type, intrinsic, N-type (PIN) diodes, and wherein each PIN diode of the plurality of PIN diodes comprises a respective portion of the first semiconductor layer, a respective intrinsic layer of the intrinsic layers, and a respective second semiconductor layer of the second semiconductor layers;

a plurality of pads disposed on top of the second semiconductor layers away from the intrinsic layers and configured to serve as external electrodes of the semiconductor switch device; and a first insulation layer embedded in the first semiconductor layer and configured to electrically isolate adjacent intrinsic layers from each other and adjacent second semiconductor layers from each other such that adjacent PIN diodes of the plurality of PIN diodes are electrically isolated from each other, wherein the first semiconductor layer is a P+ semiconductor layer and the second semiconductor layers are N+ semiconductor layers.

14. The solid-state phase shifter of claim 13, wherein shapes of the second semiconductor layers and the intrinsic layers are centrosymmetric shapes.

15. The solid-state phase shifter of claim 7, wherein there are at least two PIN diodes, wherein the at least two PIN diodes comprise at least one first PIN diode and at least one second PIN diode, wherein an area ratio of a first surface of each first PIN diode of the at least one first PIN diode to a second surface of each second PIN diode of the at least one second PIN diode is 1:N, wherein N is a rational number greater than or equal to 1, wherein the first surface of each first PIN diode of the at least one first PIN diode is of the respective second semiconductor layer of the first PIN diode, is away from the first semiconductor layer, and corresponds to a first effective area of first doped particles in the first surface, and wherein the second surface of each second PIN diode of the at least one second PIN diode is of the respective second semiconductor layer of the second PIN diode, is away from the first semiconductor layer, and corresponds to a second effective area of second doped particles in the second surface.

16. The solid-state phase shifter of claim 13, wherein each PIN diode of the plurality of PIN diodes comprises respective sidewalls formed by first surfaces of the respective intrinsic layer of the PIN diode and second surfaces of the respective second semiconductor layer of the PIN diode, and wherein the semiconductor switch device further comprises a second insulation layer that is coupled to the first insulation layer and that covers the respective sidewalls of the plurality of PIN diodes.

17. The solid-state phase shifter of claim 13, wherein the first insulation layer comprises a silicon dioxide material.

18. The solid-state phase shifter of claim 13, wherein the first insulation layer comprises a silicon nitride material.

19. The solid-state phase shifter of claim 13, wherein the semiconductor switch device further comprises a plurality of pads disposed on the second semiconductor layers.

20. The solid-state phase shifter of claim 19, wherein the pads comprise a titanium nickel aurum material, a titanium platinum aurum material, a titanium aurum material, or an aluminum material.

* * * * *